United States Patent [19]

Engelberger et al.

[11] 4,275,986
[45] Jun. 30, 1981

[54] PROGRAMMABLE AUTOMATIC ASSEMBLY SYSTEM

[75] Inventors: Joseph F. Engelberger, Newtown; Torsten H. Lindbom, Brookfield; Maurice J. Dunne, Newtown; William Perzley, Weston; Wilbur N. Roberts, Newtown; Horace L. Gardner, Ridgefield, all of Conn.

[73] Assignee: Unimation, Inc., Danbury, Conn.

[21] Appl. No.: 31,463

[22] Filed: Apr. 19, 1979

Related U.S. Application Data

[62] Division of Ser. No. 625,932, Oct. 28, 1975, Pat. No. 4,163,183.

[51] Int. Cl.³ .............................................. B25J 9/00
[52] U.S. Cl. ..................................... 414/730; 414/4; 414/732; 414/739
[58] Field of Search ................ 414/618, 733, 1, 5, 414/730, 732, 735, 738–740, 742, 744 R; 29/270; 318/562, 568, 567, 569

[56] References Cited

U.S. PATENT DOCUMENTS

| 3,826,383 | 7/1974 | Richter | 414/730 |
| 3,922,930 | 12/1975 | Fletcher et al. | 414/738 X |
| 3,985,238 | 10/1976 | Nakura et al. | 414/739 X |
| 4,011,437 | 3/1977 | Hohn | 318/568 X |
| 4,024,961 | 5/1977 | Stolpe | 414/730 X |
| 4,076,131 | 2/1978 | Dahlstrom et al. | 414/730 |

FOREIGN PATENT DOCUMENTS 2224349 11/1973 Fed. Rep. of Germany .......... 414/730

Primary Examiner—Leslie J. Paperner
Assistant Examiner—Terrance L. Siemens
Attorney, Agent, or Firm—Mason, Kolehmainen, Rathburn & Wyss

[57] ABSTRACT

A programmable automatic assembly system is provided which may be employed to assemble small parts. Each assembly station includes cooperating manipulator arms which are programmable to assemble parts on a centrally located work table. Improved facilities are provided for teaching the manipulator arms at each station, these facilities including a computer which assists the teaching operator in setting up the programs required for assembly of small parts to close tolerances. Each manipulator arm includes closed loop teach facilities for maintaining the arm at a previously located position during the teaching mode of operation. The computer is employed as a teach assist facility in performing a number of tasks during the teaching operation which are extremely difficult for the operator to perform manually. All of the assembly stations may be controlled during playback from a common disc storage facility so that the control circuitry and memory storage facilities at each manipulator are minimized.

18 Claims, 21 Drawing Figures

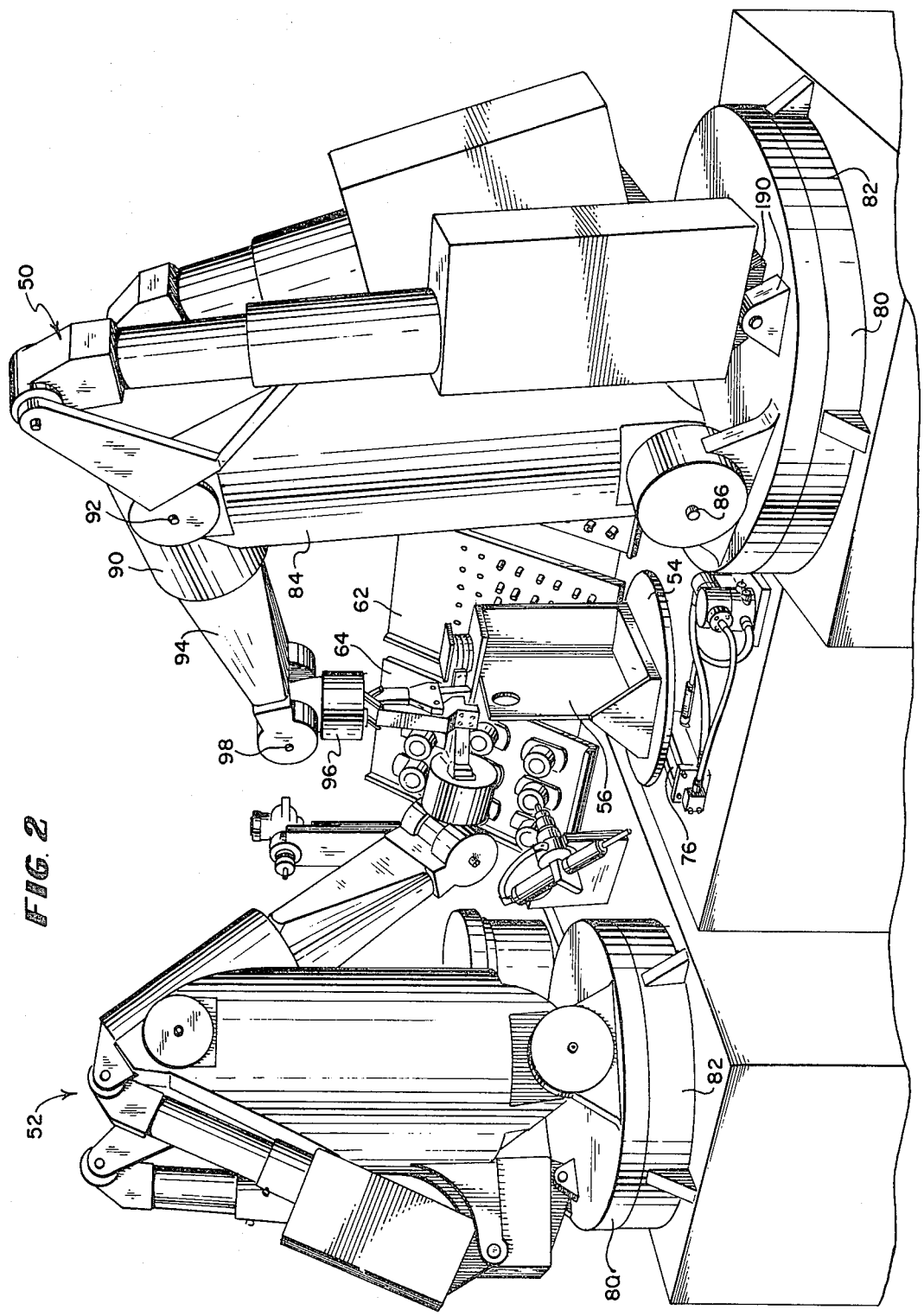

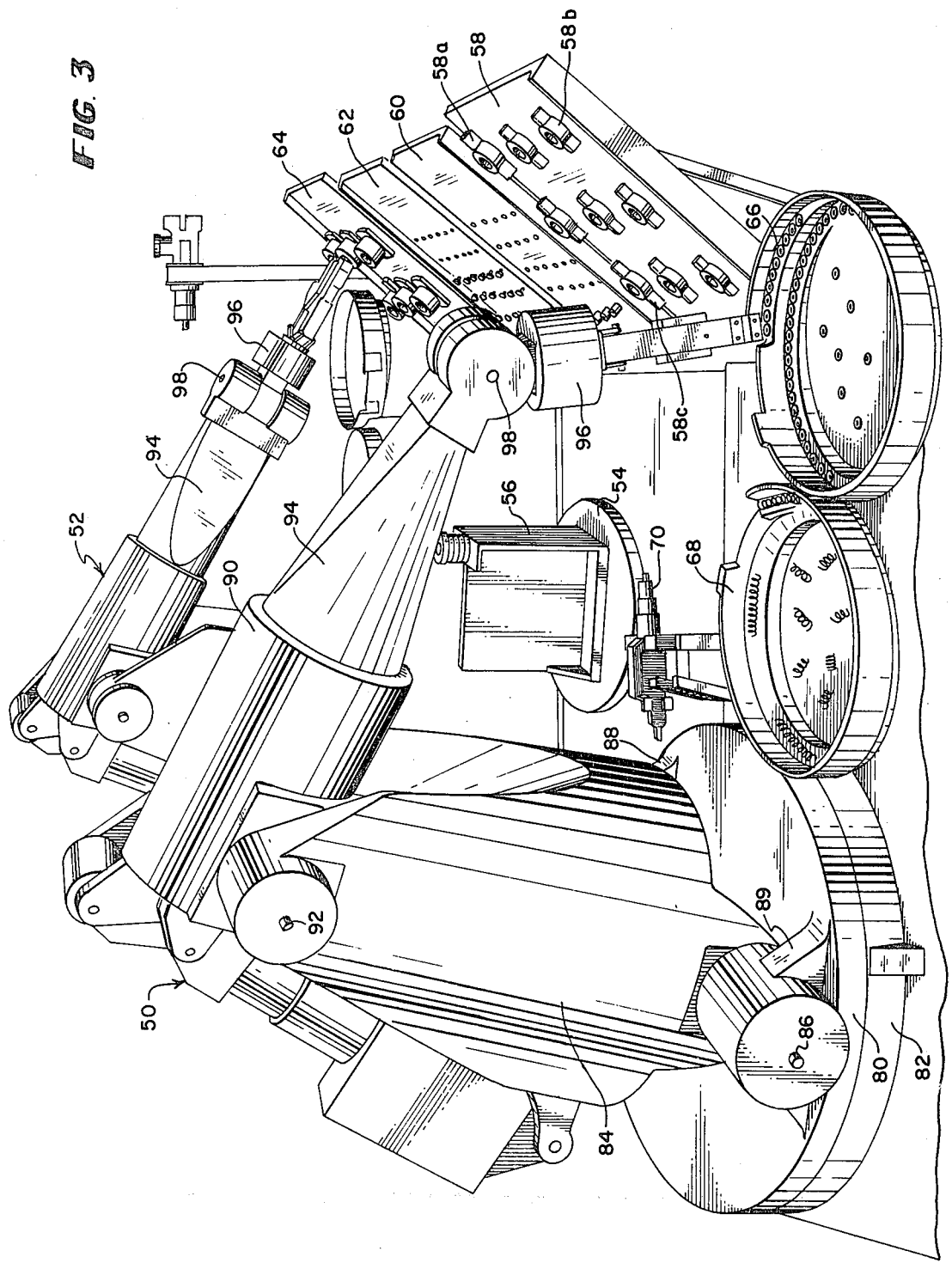

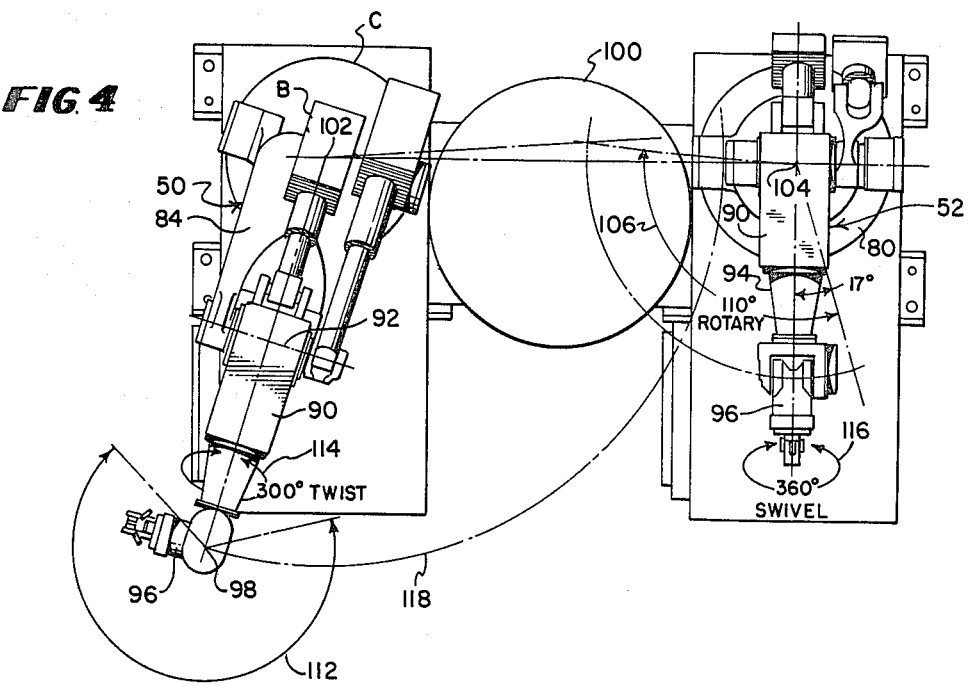
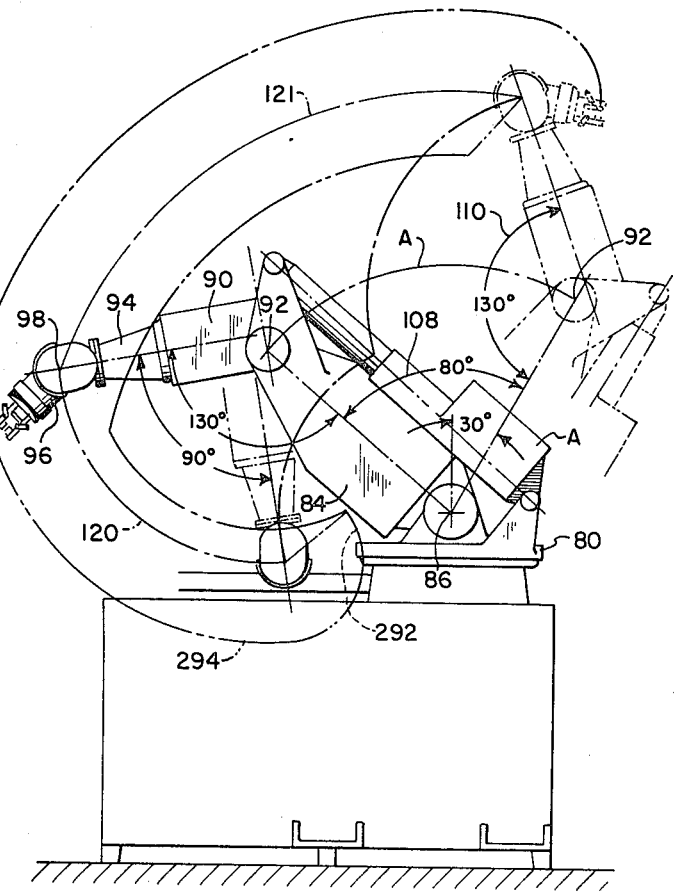

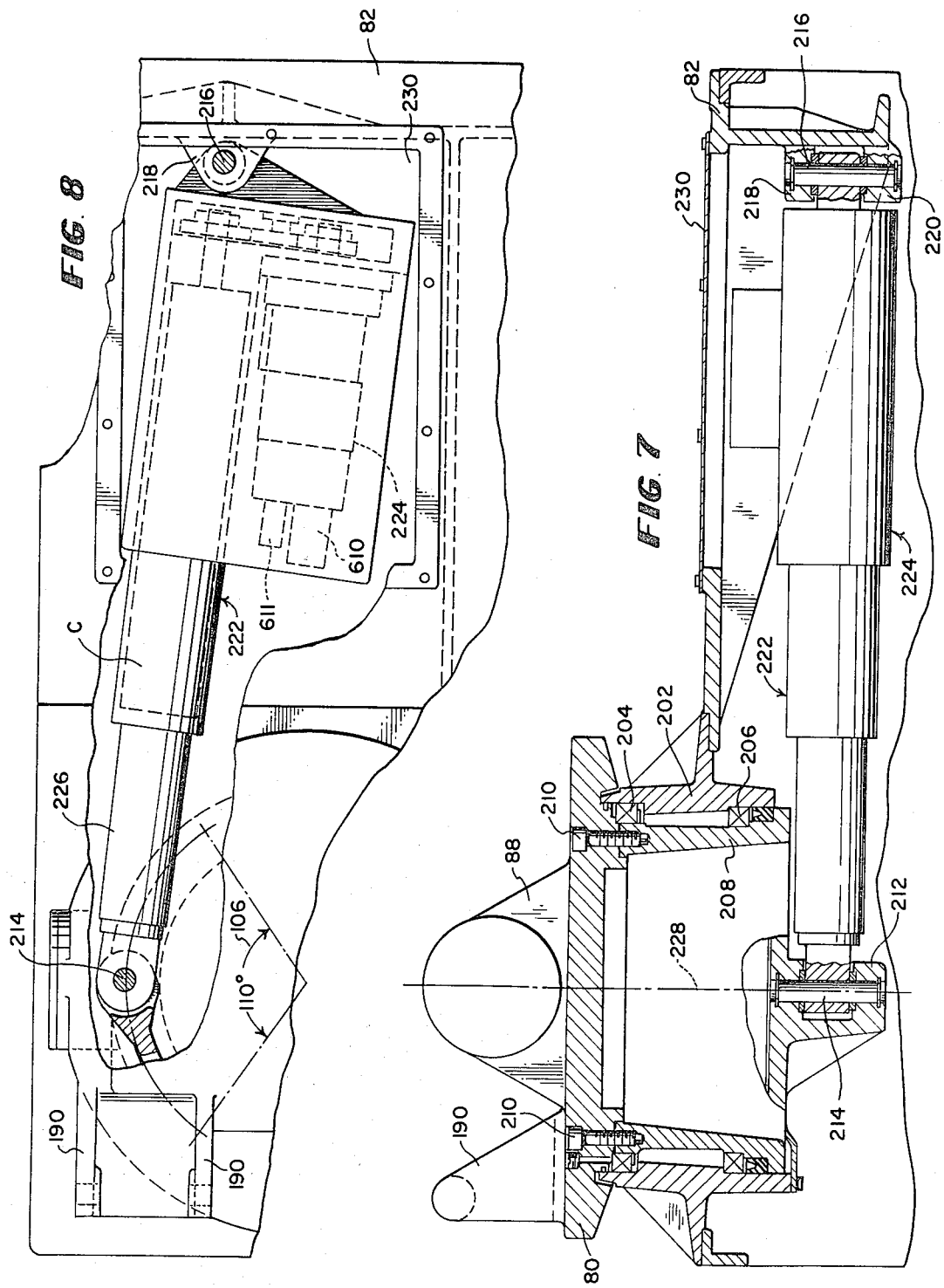

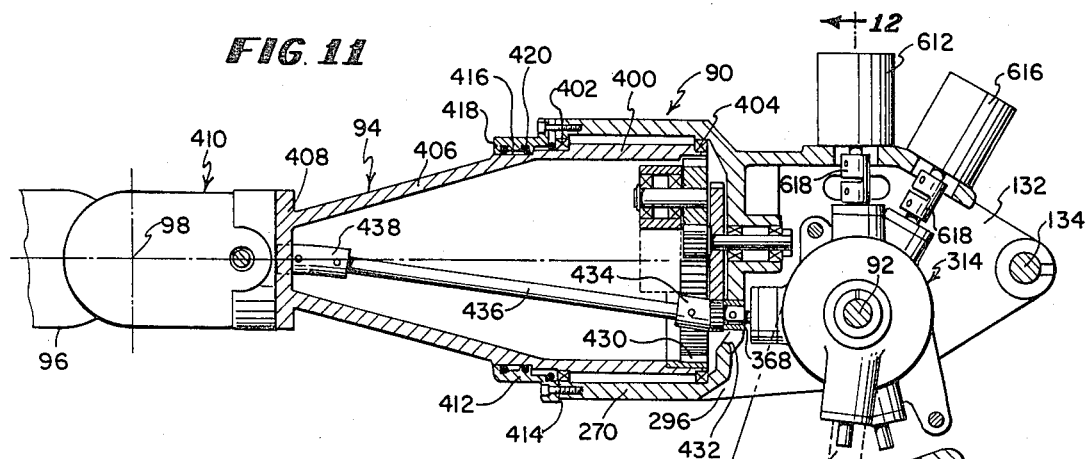
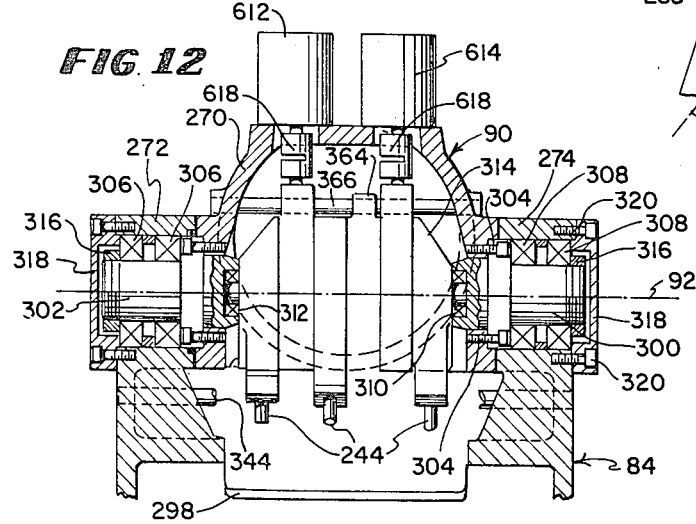
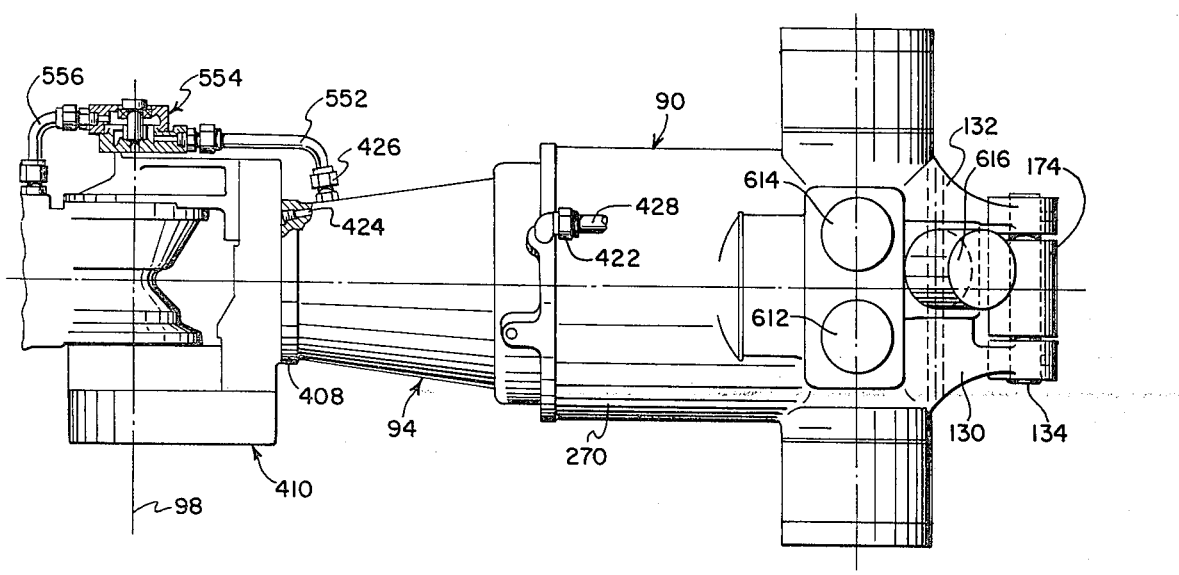

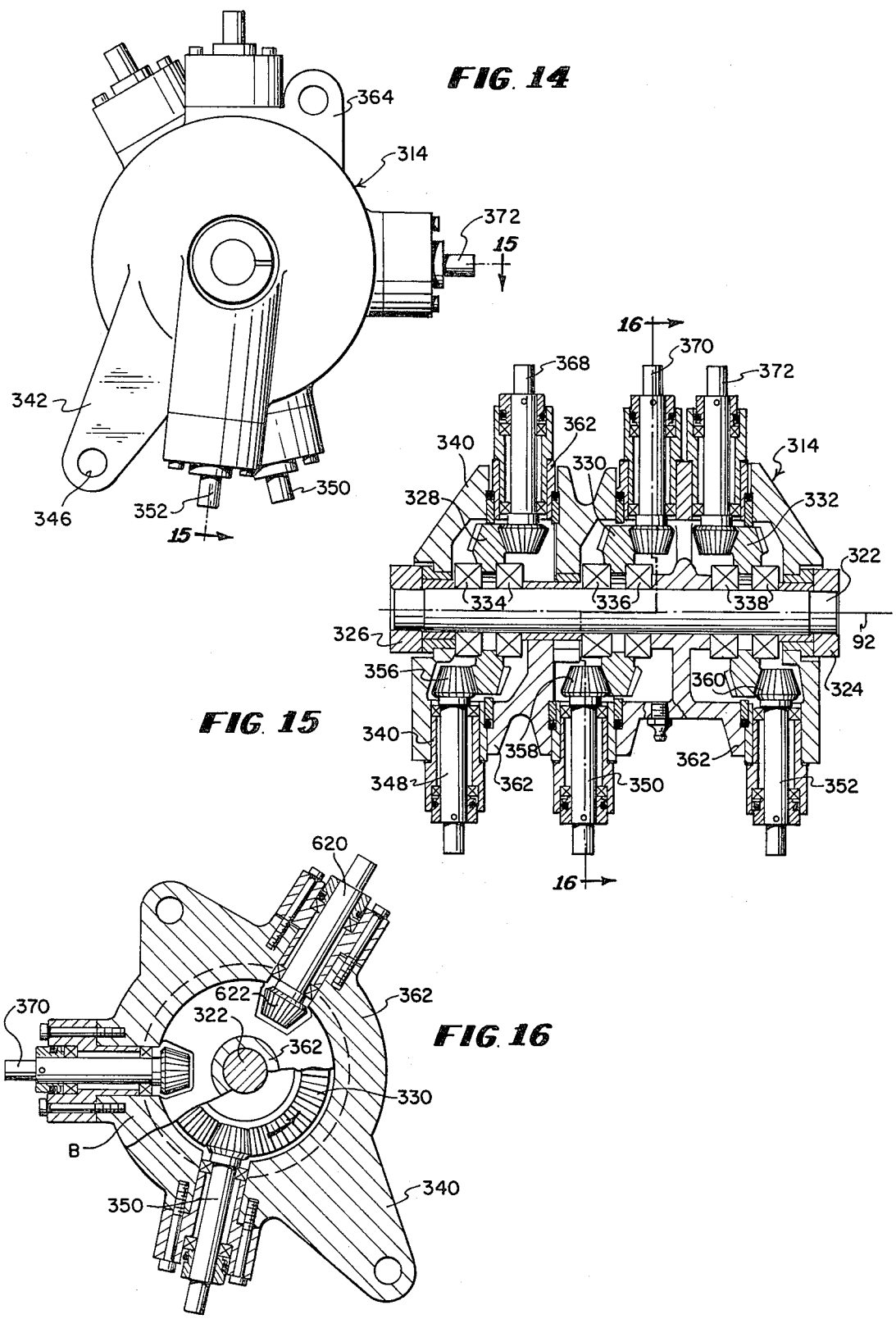

ARM POSITION DEFINED BY

PT. ③ = $\underline{a}_1 + \underline{a}_3 + \underline{a}_2$
PT. ⑤ = $\underline{a}_1 + \underline{a}_3 + \underline{a}_2 + \underline{b}$
PT. ⑥ = $\underline{a}_1 + \underline{a}_3 + \underline{a}_2 + \underline{b} + \underline{c}$

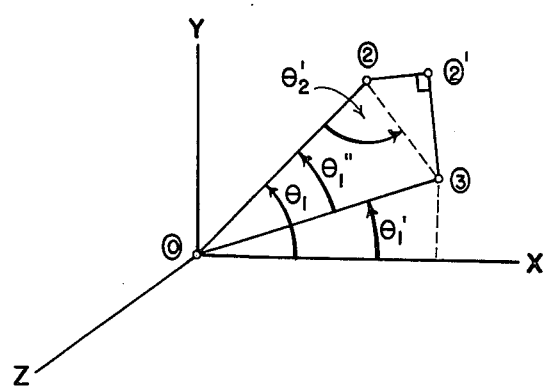
FIG. 32a
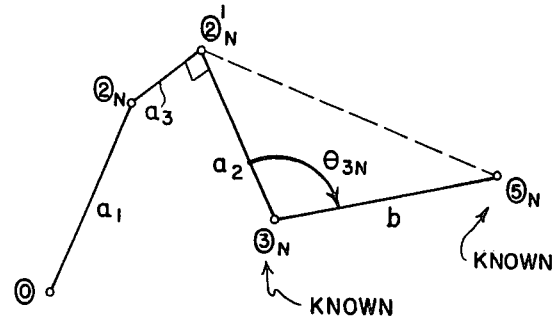
FIG. 33a
FIG. 50
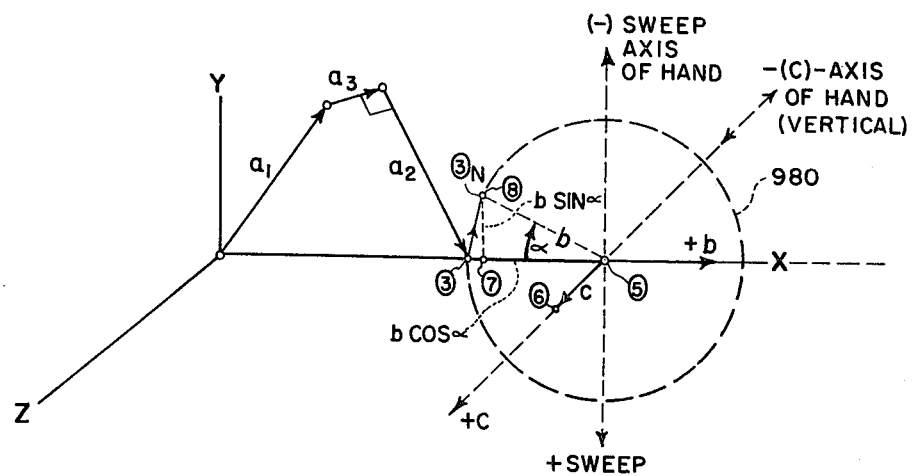

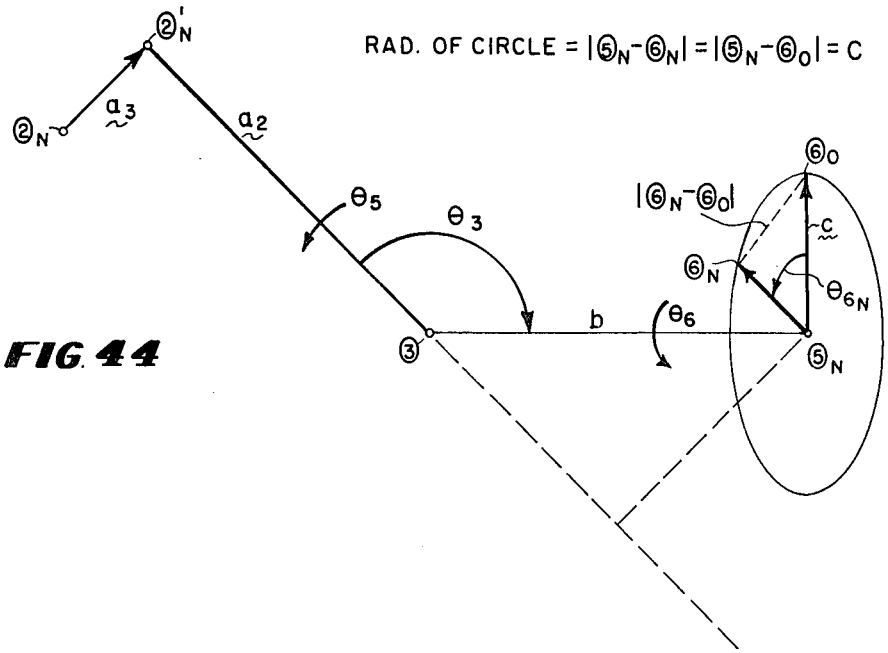
FIG. 44
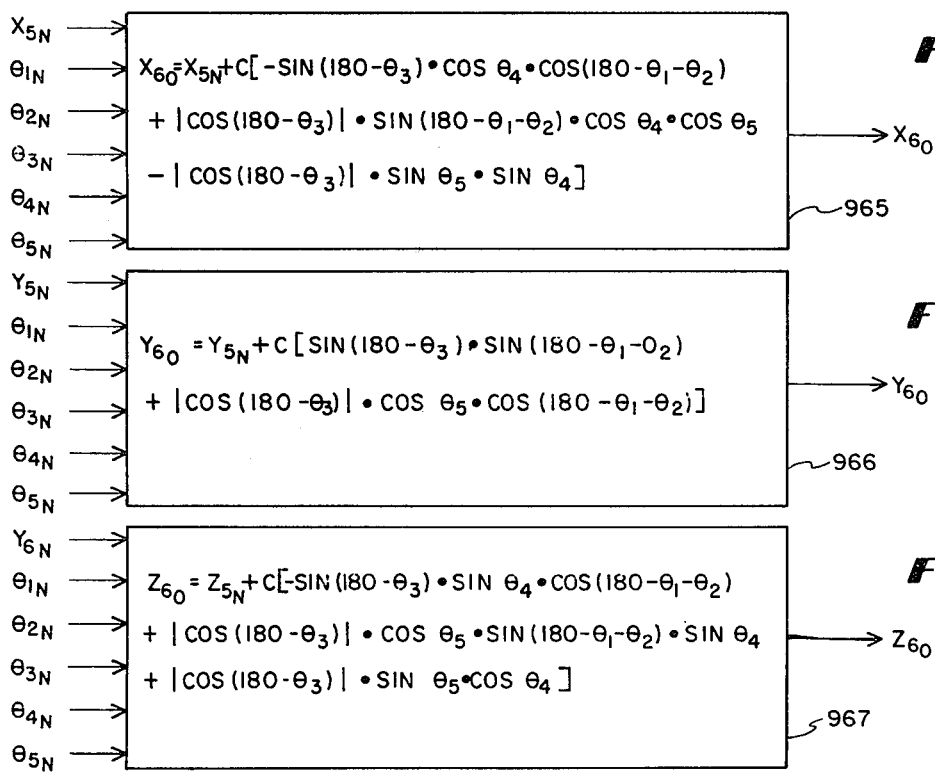

FIG. 62

| | | | | | | | GI MULTIPLEX PERIOD | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | PARITY |
| SWITCHES 1026 | ⊸⊸ | ⊸⊸ | ⊸⊸ | ⊸⊸ | ⊸⊸ | ⊸⊸ | ⊸⊸ | ⊸⊸ | ⊸⊸ | ⊸⊸ | ⊸⊸ | ⊸⊸ | ⊸⊸ | ⊸⊸ | ⊸⊸ | X |
| PTP MODE | ACC 2 | ACC 3 | SLOW SPEED | E/P | OX-1 | OX-2 | OX-3 | OX-4 | OX-5 | 0 | 0 | WX-2 | K1 | K2 | WX-1 | X |
| CP MODE | $N_1$ | $N_2$ | $N_3$ | E/P | OX-1 | OX-2 | OX-3 | OX-4 | OX-5 | 0 | 1 | WX-2 | K1 | K2 | WX-1 | X |
| | ↑ NO OF INTERPOLATION INTERVALS ↓ | | | | | | | | | | | | | | | |
| JMS MODE | $2^0$ | $2^1$ | $2^2$ | $2^3$ | $2^4$ | $2^5$ | $2^6$ | $2^7$ | $2^8$ | 1 | 0 | START ADD. SUB. LIST $2^9$ | \<— SUB # 1-7 —\> | | | X |
| | ↑ START ADDRESS OF SUB. LIST ↓ | | | | | | | | | | | | | | | |
| JMP OR JMP-R MODES | $2^0$ | $2^1$ | $2^2$ | $2^3$ | $2^4$ | $2^5$ | $2^6$ | $2^7$ | $2^8$ | 1 | 1 | START ADD. JUMP TO $2^9$ | "1" IF RETURN TO N+1 / 0 | 0 | 0 | X |
| | ↑ START ADDRESS OF JUMP TO ↓ | | | | | | | | | | | | | | | |
| COMPUTER BIT NO. | 15 | 14 | 13 | 12 | 11 | 10 | 9 | 8 | 7 | 6 | 5 | 4 | 3 | 2 | 1 | 0 |

FIG. 63

| | 1 | 2 | 3 | 4 | 5 | 6 | 7 | 8 | 9 | 10 | 11 | 12 | 13 | 14 | 15 PARITY | |
|---|---|---|---|---|---|---|---|---|---|---|---|---|---|---|---|---|
| SWITCHES 1026 | -o̸o- | -o̸o- | -o̸o- | -o̸o- | -o̸o- | -o̸o- | -o̸o- | -o̸o- | -o̸o- | -o̸o- | -o̸o- | -o̸o- | -o̸o- | -o̸o- | X | |
| PTP MODE | O | O | O | O | O | O | O | O | O | O | O | O | O | O | X | IN JMS AND JMP-R MODES; "I" MEANS LAST STEP OF SUB. |
| CP MODE | $R_1$ | $R_2$ | $R_3$ | $R_4$ | $R_5$ | $R_6$ | $R_7$ | $R_8$ | $R_9$ | OX-6 | T/D | WX-6 | WX-3 | WX-4 | WX-5 OR END/SUB | X |
| JMS MODE | $(2^0)W$ | $(2^1)W$ | $(2^2)W$ | O | O | O | O | O | O | OX-6 | TD | WX-6 | WX-3 | WX-4 | WX-5 OR END/SUB | X |
| JMP OR JMP-R MODES | O | O | O | O | O | O | O | O | O | O | O | O | O | O | X | |
| O COMPUTER BIT NO. | 15 | 14 | 13 | 12 | 11 | 10 | 9 | 8 | 7 | 6 | 5 | 4 | 3 | 2 | 1 | |

G2 MULTIPLEX PERIOD

CONTROL OF COUNTER 672 — NO. OF DIVIDER STAGES-744

NO. OF STEPS IN JMS SEQUENCE

PROGRAMMABLE AUTOMATIC ASSEMBLY SYSTEM

This is a division of copending application Ser. No. 625,932, filed Oct. 28, 1975, now U.S. Pat. No. 4,163,183.

The present invention relates to programmable manipulator apparatus, and, more particularly, to a programmable automatic assembly system which is capable of assembling small parts by virtue of the programmed coordinated movement between two manipulator arms, the article gripping hands of which are arranged to cooperate in assembling small parts at a centrally located work station.

Programmable manipulators have been employed in various industries for some time to transport articles from one location to another and to perform certain patterned operations such as welding, paint spraying or the like. Such programmable manipulators are shown, for example, in Devol U.S. Pat. No. 3,306,471 dated Feb. 28, 1967; Devol U.S. Pat. No. 3,543,947 dated Dec. 1, 1970; Dunne et al U.S. Pat. No. 3,661,051 dated May 9, 1972; Engelberger et al U.S. Pat. No. 3,744,032 dated July 3, 1973; Engelberger et al U.S. Pat. No. 3,885,295 dated May 27, 1975; Devol et al U.S. Pat. No. 3,890,552 dated June 17, 1975 and British Pat. No. 781,465. While these programmable manipulators are generally suitable for their intended purpose, they have not generally been employed in assembly line operations where numerous small parts must be assembled into larger subassemblies and the packing density of labor is highest. For example, in the automotive industry we see personnel shoulder to shoulder assembling heating and air conditioning units, dashboards, carburetors, brakes, power steering, pumps, windshield wipers, etc.

One reason why programmable manipulators or industrial robots have not been employed in assembly line operations is that heretofore it has been considered necessary to provide some sort of robot eye, in the form of a television monitoring camera or the like, and to provide suitable hand-to-eye coordination so that the robot can interpret the visual scene and provide the correct hand orientation to pick up the article and assemble it to another part. Most, if not all of these arrangements have considered that the robot eye is essential. However, hand-to-eye coordination is extremely difficult and expensive to achieve even in the simplest of assembly operations.

A further reason why programmable manipulators have not heretofore been employed in assembly line operations lies in the basic concept of assembly line production which is to reduce individual acts to the simplest acts practical, on the theory that if the job is simple a worker can be trained quickly and can be made highly adept at a simple task. Further his skill is not a bargaining asset and management is little distressed by personnel turnover. This assembly line concept is carried over into transfer machine automation wherein each station on the line performs only one peculiar function. According to this line of thinking replacement of each of the multitude of workers on an assembly line by an expensive programmable robot is not economically justifiable. Furthermore, in industries outside the automotive industry where relatively low volumes of assembly are required, special purpose assembly machines cannot be economically justified on any basis. In addition, the existing programmable manipulators have not been able to provide the necessary speed and accuracy of positioning which would be required to replace the assembly of parts by human beings. For example, simply to place two mating parts together and assembly them with screws requires a high degree of coordination and cooperation between different manipulator arms if they are to accomplish this operation automatically.

Another reason why existing programmable manipulators have not been employed to perform parts assembly on the assembly line basis is that the teaching or initial programming of each of the manipulators to perform a series of intricate tasks, many of which involve movement in oblique angles and planes, is very laborious and time consuming particularly when it is realized that assembly of parts may be required to a high degree of precision and accuracy. This is particularly true in those situations where the manipulator arm must have at least six independent degrees of freedom in order to permit the article gripping member, i.e. the hand of the manipulator, to have the range of movement necessary to accomplish small part assembly operations. In such instances the requirement for simultaneous movement in a number of different axes during the teaching operation, in order to effect desired movement of the manipulator hand along a particular line, becomes almost impossible for a human operator to perform. For example, if it is required that a pin be inserted into an opening in another part, it is extremely difficult for a human operator to choose just the right velocity components in all axes in which movement is required to give the desired resultant straight line motion along the axis of said opening, particularly where the axis of the opening is not aligned with any axis of movement of the manipulator arm.

The task of initially programming or teaching the manipulator is further complicated by the fact that facilities must be provided for supplying large numbers of unassembled parts to the assembly station where they can be picked up by the manipulator during the assembly operation. Some small parts may be supplied to a fixed pickup point by vibrator bowls or similar apparatus. However, many parts, due to their size, shape, or weight, cannot be fed to a given pickup point but instead are supplied to the assembly station on pallets, each pallet containing a fixed number of parts at different locations on the pallet. The manipulator arm then has to be programmed or taught the position of each part on the pallet so that during successive assembly operations the same type of part will be picked up from different locations on the pallet. Accordingly, the teaching of the manipulator apparatus is further complicated when palletized parts are employed during the assembly operation.

It is also important in situations where small parts are being assembled by means of two cooperating manipulator arms, as for example, when an arm inserts a spring in an opening and holds the spring down while a keeper is placed over the spring by the other arm, that the position of one arm does not move while the other arm is being programmed or taught its desired movement. In prior art arrangements, the manipulator arm may be moved to a desired position during the teaching operation and this position recorded as a program in memory storage for use on playback, but no facilities were provided for ensuring that the arm would remain fixedly at that position for any length of time. Accordingly, the arm could be moved accidentally by the operator in adjusting a part in the area of the manipulator hand. Also, the arm would droop, due to leakage in the controlling hydraulic valves if the arm were left in a particular position for an extended period of time.

It is, therefore, a primary object of the present invention to provide a programmable automatic assembly system wherein one or more of the above-mentioned disadvantages of prior art arrangements is eliminated.

It is another object of the present invention to provide a new and improved programmable automatic assembly system whereby the assembly of small parts is achieved by programmed coordinated movement between two cooperating manipulator arms.

It is a further object of the present invention to provide a new and improved programmable automatic assembly system wherein coordination between two closely-spaced programmable manipulators is employed to assemble parts on a centrally located work table and improved facilities are provided for initially teaching the two manipulators to perform the desired assembly operations.

It is another object of the present invention to provide a new and improved programmable manipulator which is particularly adapted by virtue of its speed and accuracy of positioning to be employed in the assembly of small parts at a work station adjacent to the manipulator.

It is a further object of the present invention to provide a new and improved programmable manipulator arrangement wherein facilities are provided for assisting the teaching or programming of the manipulator arm so that the article gripping hand may be moved in a particular direction and to a desired end point along that line automatically.

It is a still further object of the present invention to provide a new and improved programmable manipulator arrangement wherein a computer is employed during the initial teaching or programming of the manipulator arm to calculate the points along a desired straight line path and record these points as program steps in the manipulator memory, these steps on playback causing the manipulator hand to move along the desired straight line.

It is another object of the present invention to provide a new and improved programmable manipulator arrangement in which a computer may be used during the initial teaching or programming of the manipulator arm to perform various tasks and calculations and facilities are provided for storing the data generated by the computer at the correct program step in the manipulator memory, thereby to control movement of the manipulator arm or playback in accordance with data generated by the computer during the teaching operation.

It is another object of the present invention to provide a new and improved programmable manipulator arrangement for removing parts from or placing parts on predetermined locations on a pallet wherein a computer is employed during the initial teaching or programming of the manipulator arm to calculate from data fed into the computer regarding certain locations where the manipulator arm picks up or places parts on the pallet, the program steps necessary to move that manipulator arm to all other locations of parts on the pallet during successive playback cycles, and to record these program steps in the manipulator memory automatically.

It is still another object of the present invention to provide a new and improved programmable automatic assembly station wherein two programmable manipulator arms cooperate with a centrally located work table to assemble a plurality of parts on the table while occupying a minimum of floor space for the overall assembly station.

It is a further object of the present invention to provide a new and improved programmable automatic assembly system wherein a number of assembly stations each employing a pair of cooperating manipulator arms are employed and facilities are provided for operating these assembly stations in out of phase relationship so that a single human operator can perform certain manual tasks at each assembly station in sequence.

It is another object of the present invention to provide a new and improved programmable automatic assembly station wherein two programmable manipulator arms cooperate with a centrally located work table to assemble a plurality of parts on the table and facilities are provided during the initial teaching or programming of each manipulator arm for holding either arm in its most recently taught position while the other arm is moved to its next desired position.

It is still another object of the present invention to provide a new and improved programmable manipulator arrangement, wherein facilities are provided during the initial teaching operation for temporarily recording the position of the manipulator arm and employing each temporarily recorded position to control the position of the arm during the teaching operation until the arm is moved to a different position.

It is a further object of the present invention to provide a new and improved programmable automatic assembly system wherein a plurality of automatic assembly stations are provided each having a pair of programmable manipulator arms which cooperate in the assembly of a desired group of parts, computer storage facilities common to said stations are employed for storing a series of program steps suitable for moving each of the manipulator arms at a particular station in accordance with a desired series of movements, and control means are provided for supplying the stored program steps to the manipulator arms in each of the assembly stations as required to permit the simultaneous assembly of groups of parts at said stations.

Briefly, in accordance with one aspect of the invention, a series of programmable automatic assembly stations are provided, each of these stations including a pair of small, highly maneuverable articulated manipulator arms which can cooperate in the assembly of small parts at a centrally located work table between the manipulator arms. All of the necessary parts to complete a given assembly are positioned in predetermined locations at each assembly station and in such position that they may be grasped by one of the manipulator arms and assembled to or with other parts.

Furthermore, each assembly station includes a number of interchangeable manipulator hands so that grippers of different types, screwdrivers and other tools may be selectively connected to either manipulator arm so that a wide variety of assembly tasks can be performed at each station. Also, each of the manipulator arms at each assembly station is capable of being moved at relatively high speed and with a high degree of accuracy so that the assembly of small parts to precise tolerances can be accomplished in a minimum amount of time.

With such an assembly station concept a large number of assembly operations are performed at each assembly station which requires only a small amount of floor space as compared to a conventional assembly line in which a large number of personnel are employed, one for each assembly operation. Furthermore, since the assembly of parts is being performed simultaneously at different assembly stations, if a breakdown occurs at one assembly station, the entire production is not halted, but instead, only the production at a particular assembly station is lost. For example, in an assembly system employing twenty assembly stations, if a downtime incident occurs every twenty hours there would be a loss of production of only one-twentieth the amount if a common conveyor system were employed for the same amount of downtime.

In accordance with a further aspect of the invention, the manipulator arms at one of the assembly stations can be taught or programmed in any desired sequence of steps and the taught series of program steps may be stored in a mass memory, such as a disc file of large capacity, which is common to all of the assembly stations. If the assembly of parts is not critical in positioning of the manipulator arms, the taught series of program steps may be employed to control the manipulator arms at the other assembly stations so that identical groups of parts may be simultaneously assembled at each station. This may be accomplished by providing only storage facilities for one or two program steps at each assembly station and sequentially transferring the common stored program steps to each assembly station to effect the desired series of assembly steps at each station. Such an arrangement eliminates the requirement of large capacity, separate program storage facilities in connection with each programmed manipulator arm, as was required in past arrangements. Even if the assembly tolerances are such that the manipulator arms at each assembly station have to be separately programmed, due to manufacturing tolerances and other differences between individual manipulator arms, the provision of a large capacity central storage facility for the program steps required by each assembly station is generally more economical than providing separate storage facilities for each manipulatorm arm, as has been done in the past.

In accordance with a further aspect of the invention a teaching assist arrangement is provided wherein a computer may be interfaced with the control circuitry of a particular manipulator arm and may be employed to calculate the successive positions required to move the manipulator arm in a desired direction. The complex interrelated movements in the various axes of the manipulator arm to produce resultant movement in a desired direction require extensive calculations which are quite time consuming even for the computer to accomplish. However, by performing these calculations during the teaching operation, which is usually accomplished by moving the manipulator arm quite slowly to a desired position, and then recording the positions which have been calculated, sufficient time is provided for the computer to perform its calculations. Once these calculations have been made and the computed positions stored as program steps in the memory, they may be used as command signals during playback without requiring the assistance of the computer. This is particularly important because the computer would not be capable of carrying out these complex calculations during each playback or repeat cycle and move the manipulator arm at a sufficiently high rate of speed to be useful in assembling parts on a mass production basis.

With the specific arrangement of the present invention, the manipulator hand can be aimed in any desired direction and a desired distance along that direction may be designated by the teaching operator. The computer than performs all of the necessary calculations to accomplish straight line motion of the hand in that particular direction and to the desired distance so that insertion of one part within another, taking parts from a pallet, and other complex teaching jobs are substantially simplified. In accordance with another aspect of the invention, the calculations performed by the computer are substantially simplified by making the assumption that the outer three axes of the manipulator arm, which control orientation of the manipulator hand, all move in parallel straight line motion in the particular desired direction. This assumption introduces only very slight errors if movement from one program point to the next is kept quite small, and the time required for the computer to perform the necessary calculations is substantially reduced by making this assumption.

In accordance with another phase of the invention, the computer may be employed during the teaching operation to assist the teaching operator in recording a series of program steps which are required when the manipulator arm picks up parts from, or places parts on, a pallet. Specifically the operator may move the manipulator arm to three points on the pallet at which parts are to be picked up, such as the parts at three corners of the pallet, and data regarding these three positions are fed into the computer along with data as to the number and spacing of parts on the pallet. The computer than calculates the required position of the manipulator arm to pick up all other parts on the pallet and record the calculated positions as program steps which will be used on playback to pick up successive parts from the pallet during successive playback cycles.

In accordance with another aspect of the invention, facilities are provided for moving the manipulator hand in a straight line path between two programmed end points. This arrangement substantially reduces the number of program steps which must be recorded to accomplish a desired series of movements, particularly when these movements involve complex curved paths, and the like. To effect such straight line motion, the distance to be moved in each axis is divided into a number of equal increments and artificial command signals are generated at equally spaced intervals which are employed to move the manipulator arm at a constant velocity in each axis proportional to the distance to be moved in that axis. During the teaching operation a computer may be employed to calculate the number of increments and the rate of generation of said increments necessary to providde a predetermined velocity on playback and these calculations are stored at the appropriate program step in the manipulator memory for use during playback.

In accordance with a further aspect of the invention facilities are provided for the inclusion of one or more manually performed assembly steps at each assembly station in timed relationship so that a single human operator can perform the same manual assembly steps at all of the assembly stations. For example, if a limp O-ring is to be inserted at a particular point in an assembly operation, this operation being performed more readily by hand than by the programmed manipulator, the assembly operations at each assembly station are coordinated so as to permit a human operator to perform the manual assembly step at a particular assembly station and then move on to the next assembly station and perform the same manual step at that station. As a result, a single human operator may serve a large number of assembly stations each of which is simultaneously assembling a group of parts.

The invention, both as to its organization and method of operation, together with further objects and advantages thereof, will best be understood by reference to the following specification taken in connection with the accompanying drawings in which:

FIGS. 1 to 3, inclusive, are perspective views of the programmable automatic assembly station of the present invention;

FIG. 4 is a diagrammatic plan view of the assembly station of FIG. 1 showing the motions in various axes thereof;

FIG. 5 is a diagrammatic right side view of the assembly station of FIG. 4;

FIG. 7 is a fragmentary view similar to FIG. 6 and showing the base drive portion of the manipulator of FIG. 6;

FIG. 8 is a fragmentary, plan view of the manipulator base portion of FIG. 7;

FIG. 11 is a sectional view of the forearm portion of the manipulator of FIG. 6 taken along the forearm twist axis thereof;

FIG. 12 is a sectional view taken along the line 12—12 of FIG. 11;

FIG. 13 is a fragmentary plan view of the manipulator forearm portion of FIG. 11;

FIG. 14 is a rear view of the gear drive portion of FIG. 11 taken on a somewhat larger scale;

FIG. 15 is a sectional view taken along the line 15—15 of FIG. 14;

FIG. 16 is a sectional view taken along the line 16—16 of FIG. 15;

Figure 1:
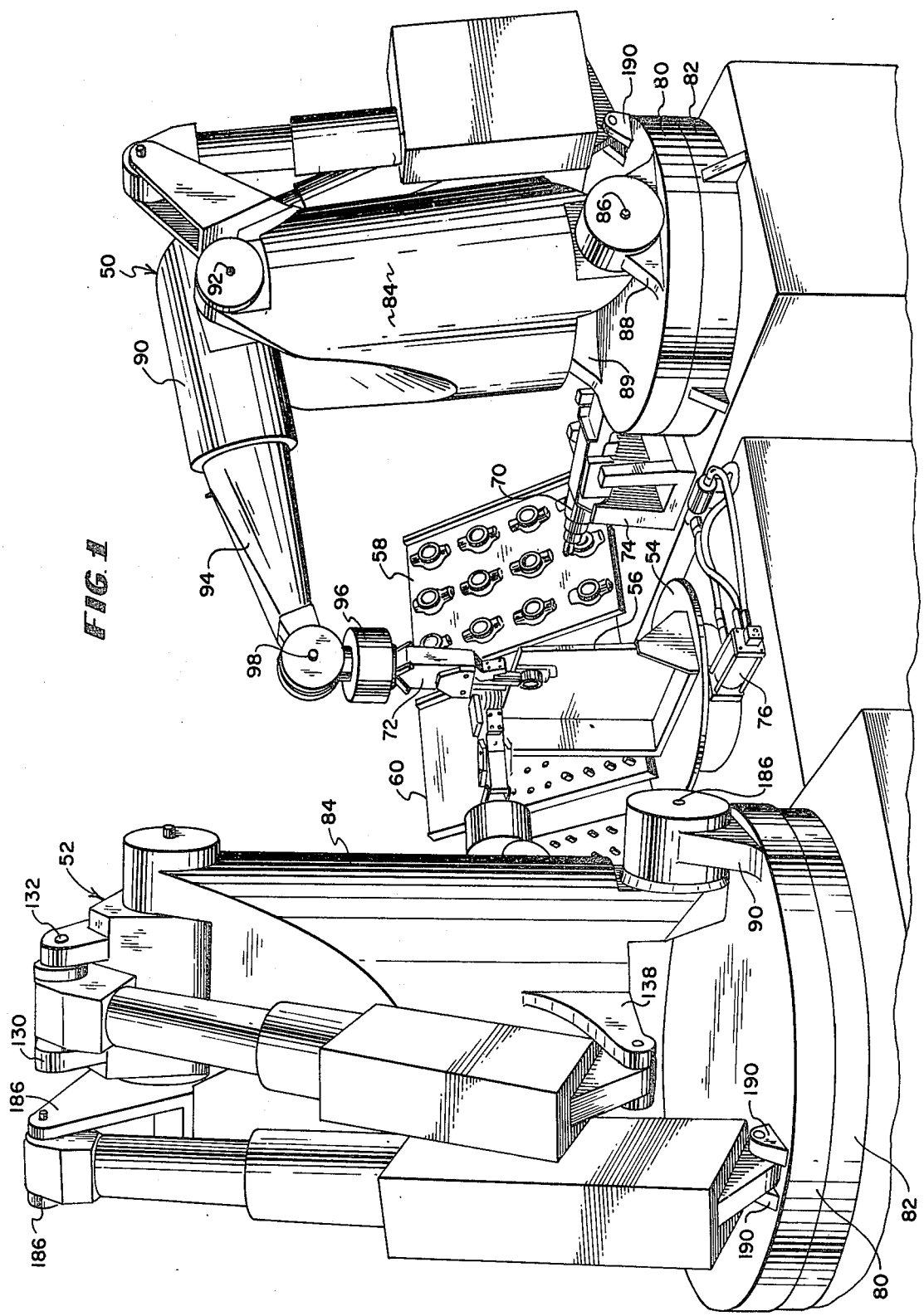

Referring now to the drawings, and more particularly to FIGS. 1 to 21, inclusive thereof, the programmable assembly system of the present invention comprises a plurality of automatic assembly stations one of which is shown in FIGS. 1, 2 and 3, it being understood that a number of similar automatic assembly stations are provided in the overall system and are arranged to be controlled by a common computer arrangement or common storage facilities as will be described in more detail hereinafter.

Each of the automatic assembly stations shown in FIGS. 1 to 3, inclusive, includes a pair of programmable manipulator arms, indicated generally at 50 and 52 which are positioned on opposite sides of a centrally located rotatable work table. The table 54 includes a vertically extending work plate 56 on which parts may be positioned for assembly with other parts thereon to provide a completed subassembly of parts.

In accordance with an important aspect of the invention, the manipulator arms 50 and 52 are capable of moving at high speed and may be positioned with a high degree of accuracy so that the assembly of small parts to precise tolerances can be achieved. Furthermore, each of the manipulator arms 50, 52 is provided with six degrees of angular motion and is comparable in its flexibility and versatility to the human arm so that individual parts which are positioned in predetermined locations on work pallets 58, 60, 62 and 64 may be grasped by the article gripping hand of one of the manipulator arms, removed from the pallet and assembled on the work plate 56 in the desired sequence to effect a particular assembly of parts on the work table 54. Also nested around the working area of the manipulator arms 50, 52 are a series of vibrator bowls 66, 68, which may contain various small parts such as springs, washers, and the like, and are positioned so that the article gripping manipulator hand may grasp one of these items at a predetermined location and insert it in the desired sequence during the assembly operation.

In order that a wide variety of parts may be grasped and assembled with other parts, each of the manipulator arms 50, 52 is provided with a series of interchangeable manipulator hands, such as the manipulator hands 70 and 72 associated with the manipulator arm 50, the hands 70 and 72 being held in a bracket 74 when not in use in such position that they may be automatically inserted into a cooperating socket in the end of the manipulator arm.

Also, to facilitate the insertion of one part within another at tolerances which are more precise than the positioning accuracy of the manipulator arms 50, 52, the work table 54 is arranged to be vibrated by a vibrator 76 which is mechanically connected to the base of the work table 54. In addition, the work table may be rotated to different indexed positions to facilitate the insertion of parts on the work plate 56 by the arms 50, 52.

Considering now the mechanical arrangement of the manipulator arms 50, 52 which permits the rapid assembly of parts at high accuracies, each of the manipulator arms, such as the manipulator arm 50, includes a rotary platform 80 which is movable about a vertical axis and is supported by the main base member 82 of the manipulator 50. A shoulder arm portion 84 is pivotally mounted on a horizontal shoulder joint or axis 86 by means of a pair of upstanding ear portions 88 and 89 on the platform 80. An elbow arm portion 90 is pivotally mounted on the upper end of the shoulder arm portion 84 and is connected to the arm portion 84 by means of a horizontal elbow joint or axis 92. A forearm portion 94 which is coaxial with the elbow arm portion 90 is rotatable about the axis of the elbow arm portion 90 to effect a so-called forearm twist motion. The outer end of the manipulator hand 96 is provided with a socket adapted to receive one of the manipulator hands 70, 72 and may be rotated about a wrist bend axis 98 at the end of the forearm portion 94. The outer end portion 96 of the manipulator hand may also be rotated in a wrist swivel axis which is perpendicular to and intersects the wrist bend axis 98.

In accordance with an important aspect of the invention, movement of each of the manipulator arms 50, 52 in the above described six different axes is arranged so that the different manipulator hands attached to the end of each manipulator arm may be employed to accomplish a wide variety of assembly operations with respect to the centrally located work area. Thus, referring to FIGS. 4 and 5, the area of the rotatable work table 54, indicated generally by the circle 100 in FIG. 4, is positioned somewhat ahead of and spaced between the two waist or rotary motion axes 102 and 104 of the manipulator arms 50 and 52, respectively. Furthermore, the rotary motion of each manipulator arm in the waist axes 102, 104 is limited to 110 degrees as indicated by the arc 106 for the manipulator arm 52, a similar but mirror image motion being provided for the manipulator arm 50. Motion about the shoulder axis 86 (FIG. 5) is limited to 80 degrees, as indicated by the arc 108 in FIG. 5. Movement in the elbow axis 92 may be approximately 130 degrees, as indicated by the arc 110 in FIG. 5. Movement in the major axes, i.e. the waist, shoulder and elbow axes, is limited in the manner described above so that motor driven precision ball-screw linear actuators may be employed to drive the indicated arm portions over these limited ranges of movement and position the same with a high degree of accuracy while moving these relatively heavy portions of the manipulator at a high rate of speed, as will be described in more detail hereinafter.

In order to provide drive means for the outer three axes, i.e. the forearm twist, the wrist bend and wrist swivel axes, which will permit more extensive movement of the outer end of the manipulator arm, while avoiding rotational inertia effects which become increasingly important at high speeds, the drive means for these three outer axes are all located within the shoulder arm portion 84 of each manipulator arm and each drive means is directly connected by gearing to the outer end of the manipulator arm through coaxially arranged beveled gear drive systems arranged along the elbow axis 92, as will be described in more detail hereinafter. Accordingly, the manipulator hand portion 96 can be moved in the wrist bend axis 98 through an arc of approximately 240 degrees as shown by the arrow 112 in FIG. 4. The forearm twist portion 94 of each manipulator arm may be rotated through an arc of approximately 300 degrees as indicated by the arrow 114 in FIG. 4 and the manipulator hand portion 96 may be rotated continuously through 360 degrees in the wrist swivel axis as indicated by the arrow 116 in FIG. 4. As a result, each of the manipulator arms 50, 52 may be moved so that its wrist bend axis follows the center line indicated at 118 in FIG. 4 for the manipulator 50, with respect to the waist axis 102. The wrist bend axis 98 is also movable along the center line indicated at 120 in FIG. 5 as the elbow arm portion 90 is moved about the elbow axis 92 from the position shown in full lines to the position shown in dotted lines in FIG. 5 and as the shoulder portion 84 is moved from the position shown in full lines to the position shown in dotted lines in FIG. 5 the axis 98 is movable along the center line 121. It will thus be seen that complete coverage of the work area around the work table 54 is provided by the cooperating manipulator arms 50, 52 while at the same time providing an arrangement whereby each manipulator hand may be moved at a high rate of speed and accurately positioned to accomplish the desired assembly operations in a minimum amount of time.

Considering now the manner in which each manipulator arm is moved in the three major axes, i.e. the waist, shoulder and elbow axes, consideration will first be given to the manner in which the elbow arm portion 90 is moved about the elbow axis 92. Thus, referring to FIGS. 6, 11 and 13 the elbow arm portion 90 is provided with a pair of rearwardly extending ear portions 130 and 132 which support a pivot pin 134 therebetween and the shoulder arm portion 84 is provided with a pair of rearwardly extending flange portions 136 and 138 which support a pin 140 therebetween. A motor driven precision ball screw linear actuator indicated generally at 142, is positioned between the pins 134 and 140 so that when the actuator 142 is extended or retracted, the elbow arm 90 is pivoted around the elbow axis 92 with respect to the shoulder arm portion 84 of the manipulator. More particularly, a main housing 144 is pivotally mounted on the pin 140 and supports an hydraulic drive motor 146 the output shaft 148 of which carries a gear 150. The gear 150 is in mesh with an idler gear 152 which is mounted on the stub shaft 154 carried by the housing 144 and the idler gear 152 in turn meshes with a gear 156 on the end of the shaft portion 158 of a ball screw 160, the shaft portion 158 being mounted in the bearings 162 and 164 in the housing 144. Preferably, the idler gear 152 is offset from the gears 150 and 156 and is movable so that it can be adjusted for zero backlash.

A ball nut 166 is mounted on the ball screw 160 so that it will be advanced along the length of the screw 160 as this screw is rotated in response to energization of the motor 146, it being understood that suitable balls are provided between the threads of the ball screw 160 and internal races within the ball nut 166 so that the ball nut 166 is advanced as the screw 160 is rotated. An actuator sleeve 168 is slidably mounted within an outer sleeve portion 170 of the housing 144, the inner end of the sleeve 168 being secured to a portion 172 of the ball nut 166 which rides on the inner surface of the housing sleeve 170, and the upper end of the actuator sleeve 164 is provided with a cap portion 174 which is pivotally mounted on the pin 134. The upper end of the ball screw 160 is rotatably mounted within the actuator sleeve 168 by means of the bearing 176 and a pair of stop collars 178 and 180 are provided at the opposite ends of the ball screw 160 which cooperate with shoulders 182 and 184, respectively, on the ball nut 166 to limit travel of the ball nut 166 in either direction. When either of the shoulders 182 or 184 is engaged by the ball nut 166 the hydraulic motor 146 ceases to rotate the elbow arm portion 90, thereby defining the limits of the arcuate movement 110 (FIG. 5).

In order to pivot the shoulder arm portion 84 about the horizontal shoulder axis 86, the upper end of the shoulder arm portion 84 is provided with the upwardly and rearwardly extending ear portions 186 (FIG. 6) which support a pivot pin 188 therebetween and the rotary platform 80 is provided with a pair of upstanding ear portions 190 which support a pivot pin 192 therebetween. A motor driven precision ball screw linear actuator indicated generally at 194 (FIG. 6) is positioned between the pivot pin 188 on the shoulder portion 84 and the pivot pin 192 on the platform 80 so that as the actuator sleeve portion 196 of the actuator unit 194 is extended the shoulder arm portion 84 is tilted through an arc about the vertical axis as indicated at 108 in FIG. 5. The linear actuator 194 includes a main housing 198 which mounts hydraulic motor 200, similar to the motor 146. In other respects the linear actuator 194 is substantially identical to the linear actuator 142 described in detail heretofore. Accordingly, it will be understood that when the motor 200 is energized the actuator sleeve 196 is extended or retracted so as to pivot the shoulder arm portion 84 about the axis 86.

Considering now the manner in which the rotary platform 80 is moved about the vertical waist axis, the main base member 82 of the manipulator arm is employed as a support for an annular casting 202 which is provided with upper and lower tapered bearings 204 and 206 which in turn mounts an internal sleeve casting 208 which is secured to the rotary platform 80 by means of the cap screws 210. The member 208 is provided with a downwardly depending offset ear portion 212 and a pivot pin 214 is mounted in this offset portion of the member 208, another pivot pin 216 being mounted in a pair of spaced ear portions 218 and 220 formed in the base member 82 at the end thereof remote from the platform 80. A motor driven precision ball screw linear actuator unit indicated generally at 222 is mounted between the pivot pins 214 and 216, this actuator unit 222 including an hydraulic motor 224 and being in other respects similar to the actuator unit 142 described in detail heretofore. Accordingly, when the actuator sleeve 226 of the unit 222 is extended and retracted the platform 80 is rotated about the waist axis 228 through a range of 110 degrees, as shown in FIG. 4 and 8. A removable cover 230 is provided for the base member 82 in the vicinity of the actuator unit 222 so as to permit service and repair on this unit. In this connection it will be noted that by limiting movement in the waist or rotary axis to 110 degrees, the safety of personnel working near the assembly station is enhanced since the manipulator arm cannot be moved outside this arc. However, this arc of rotary motion may be adjusted as desired relative to the base of the manipulator, by adjustment of the platform 80 before it is clamped to the member 208.

Figure 6:
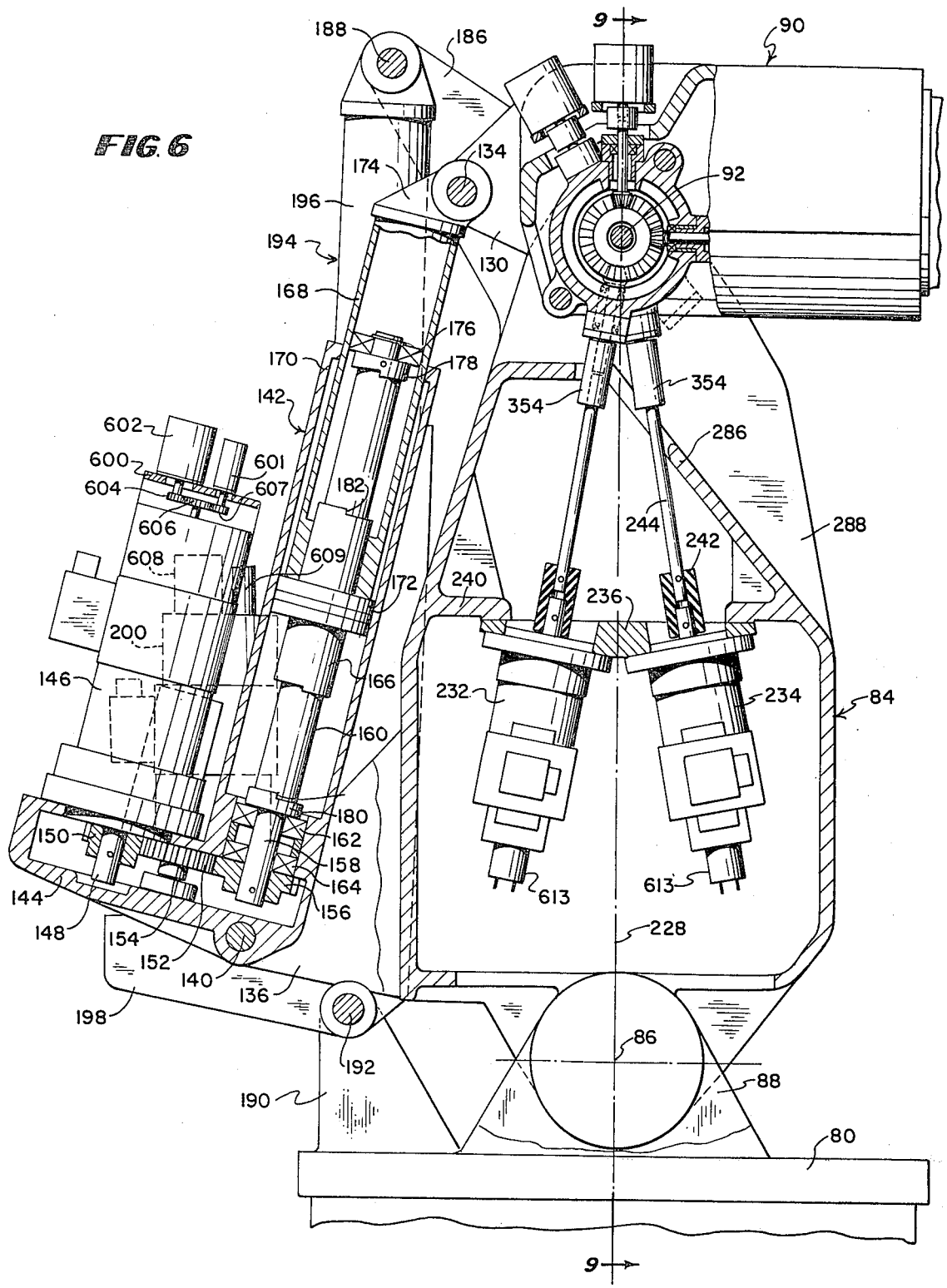
FIG. 6 is a fragmentary, front elevational view, partly in section, of one of the manipulators of the assembly station of FIG. 1.
Figure 9:
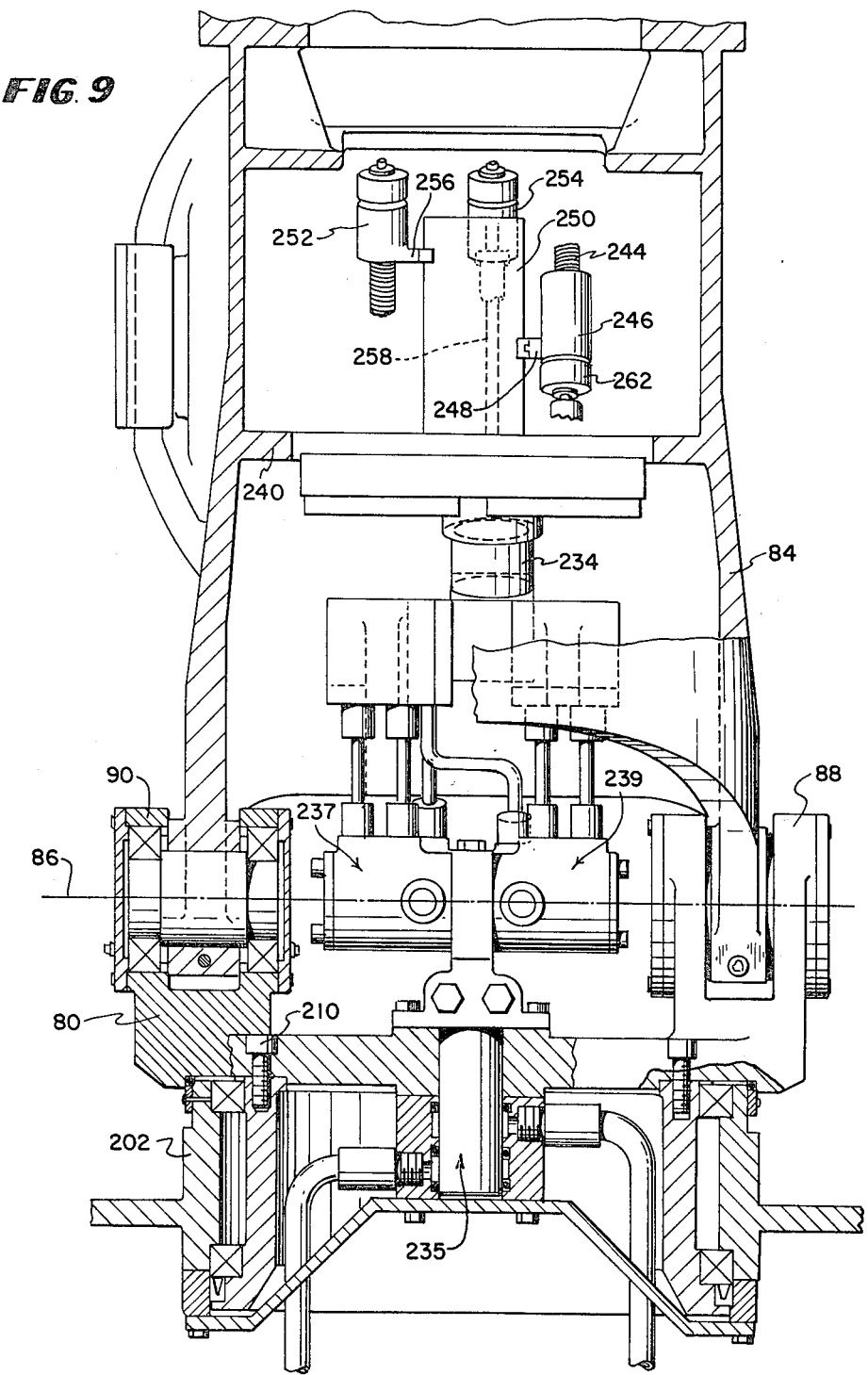
FIG. 9 is a fragmentary sectional view taken along line 9—9 of FIG. 6.
Figure 10:
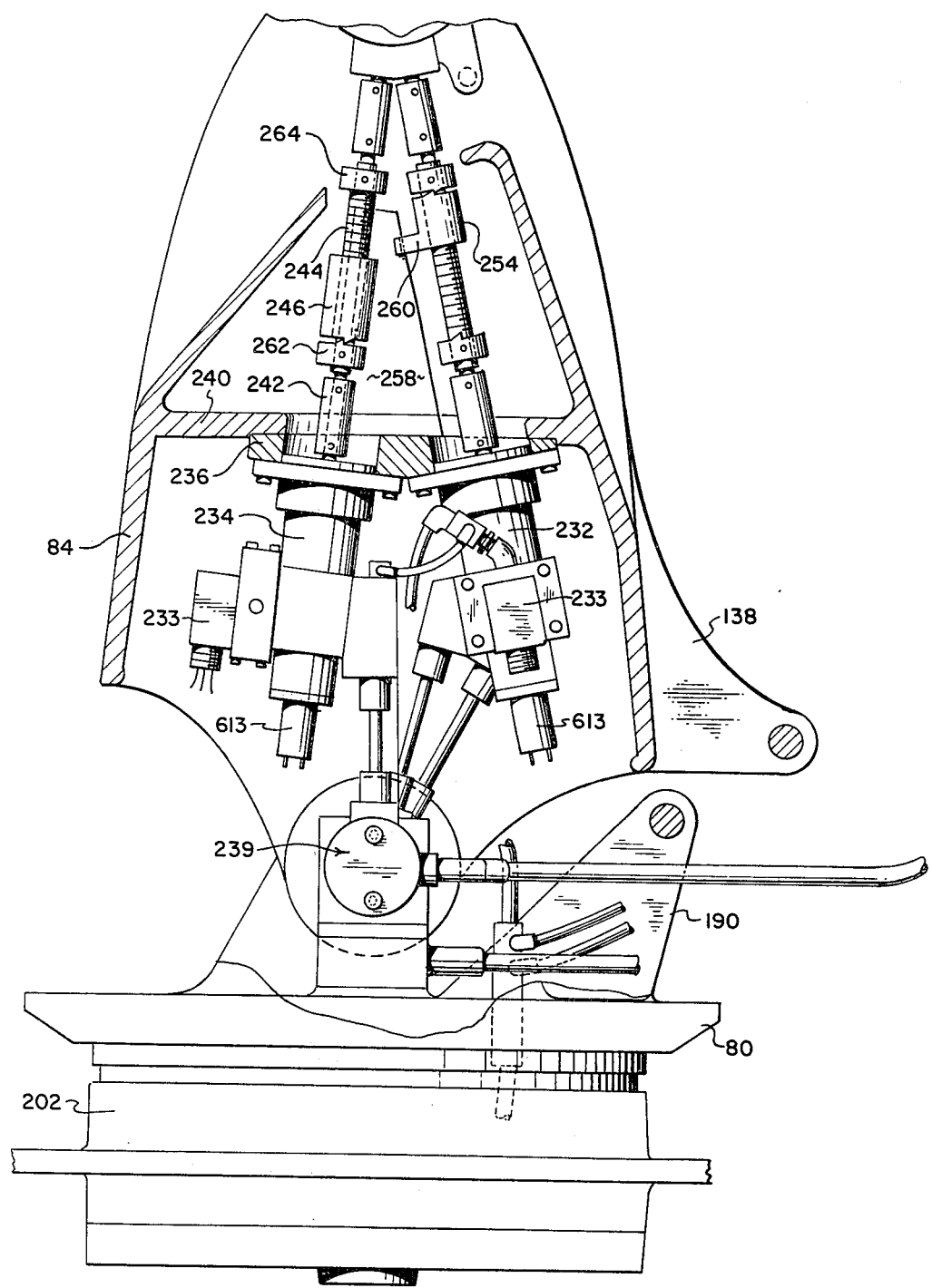
FIG. 10 is a fragmentary rear view of the manipulator of FIG. 6.
Figure 17:
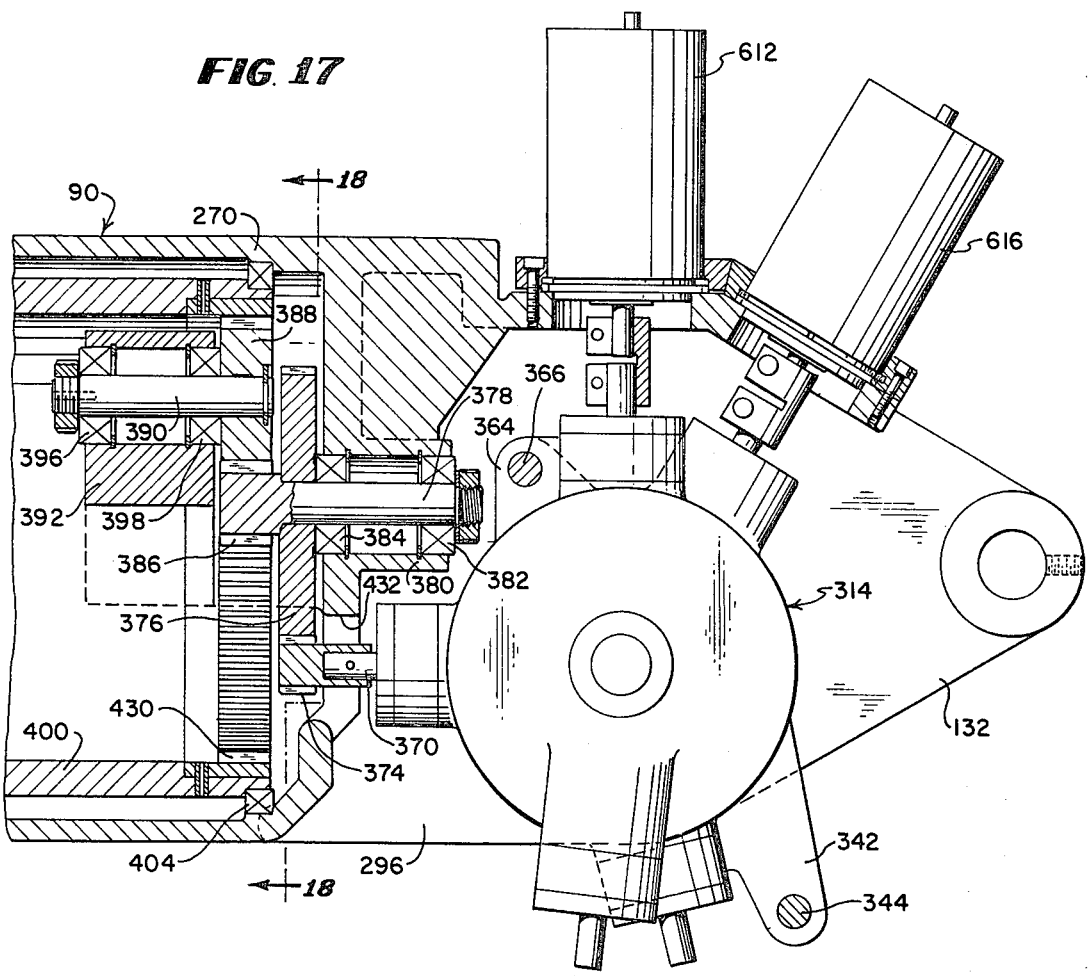
FIG. 17 is a fragmentary side elevational view similar to FIG. 11 but taken on a somewhat larger scale.
Figure 18:
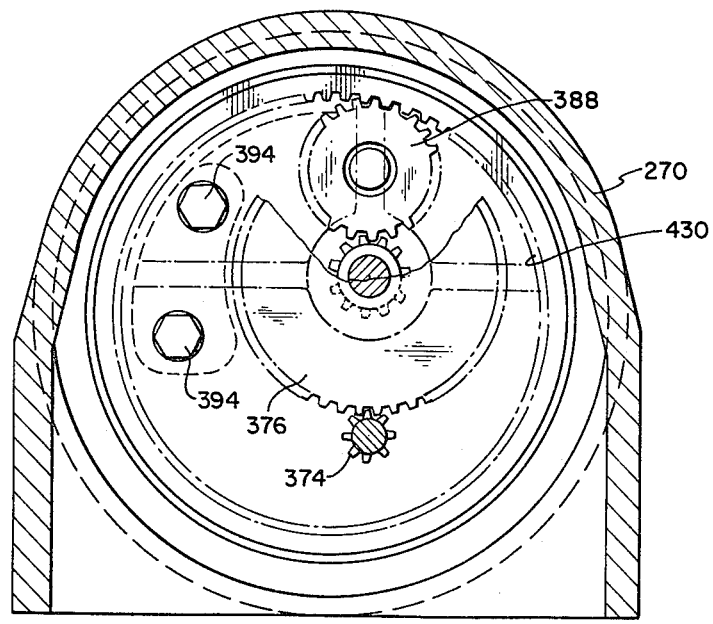
FIG. 18 is a sectional view taken along the line 18—18 of FIG. 17.

Considering now the drive means provided for the three outer axes, i.e. the forearm twist axis, and the wrist bend and wrist swivel axes, three hydraulic motors, two of which are shown in FIG. 6 at 232 and 234 are mounted within the shoulder arm portion 84. More specifically, these hydraulic motors are mounted on a plate 236 which is secured to the underside of a transverse partition 240 provided intermediate the height of the shoulder arm 84, these three hydraulic motors being mounted so that their axes intersect the elbow axis 92 at spaced points along this axis. These motors are controlled by the servo valves 233 (FIG. 10) and are supplied with hydraulic fluid through the main rotary joint 235, which permits rotary movement of the platform 80, and the pressure line rotating joint 237 and returns line rotary joint 239, which permit movement about the shoulder axis 86, the three hydraulic motors being connecting to different sections of the joints 237 and 239.

In order to limit movement of the manipulator hand in the twist, bend and swivel axes while providing an arrangement whereby each of the motors 232, 234 is directly connected to control a particular axis of movement of the hand, each motor, such as the motor 232 is provided with a flexible coupling 242 connected to the end of the motor, this flexible coupling being connected to a screw 244 (FIG. 10) along which rides a stop nut 246, the stop nut 246 being restrained from rotation by means of a transversely extending lug portion 248 (FIG. 9) having a bifurcated end portion which rides in the edge of a plate 250 mounted within the shoulder arm portion 84. Similar stop nuts 252 and 254 are provided for the other two axes, the stop nut 252 having a lug portion 256 which engages the other edge of the plate 250 and the stop nut 254 having a similar lug portion 260 which engages a transversely extending plate 258 which is secured to the plate 250 intermediate its edges. A pair of stop collars, such as the stop collars 262 and 264, (FIG. 10), are secured to each of the three screws 244, these stop collars being provided with shoulders which engage cooperating shoulders on each stop nut, such as stop nut 246 shown in FIG. 10 to limit rotation in each axis to the amount of angular movement required in each axis, as described in detail heretofore in connection with FIGS. 4 and 5.

Considering now the manner in which the elbow arm portion 90 is pivotally mounted on the upper end of the shoulder arm 84 for pivotal movement about the elbow axis 92 and also the arrangement whereby suitable gearing is provided along the axis 92 for interconnection of the hydraulic motors 232, 234 etc. to the respective control axes for the manipulator hand portion 96, the elbow arm portion 90 includes a cylindrical outer housing 270 (FIG. 11) which is mounted between a pair of spaced ear portions 272 and 274 (FIG. 12) provided at the upper end of the shoulder arm portion 94. The forward wall 276 of the shoulder portion 84 is shaped to define a cylindrical trough portion 288 (FIG. 6) which permits the housing 270 to be tilted about the axis 92 to the position shown in dotted lines at 290 in FIG. 11. With such an arrangement, when the elbow arm 90 is lowered and the shoulder arm portion 84 is tilted forwardly the manipulator hand portion 96 may be moved relatively close to the rotary platform 80 of the manipulator, as shown by the portion 292 of the trajectory 294 shown in FIG. 5 which represents movement of the outer end of the article gripper attached to the hand portion 96. In order to permit such movement of the housing 270 around the axis 92, the bottom portion thereof is open in the area shown at 296 in FIG. 11 so as to provide clearance for the gearing associated with the rotatable shafts 244 which extend upwardly through an opening 298 in the shoulder arm portion 84.

The housing 270 is provided with a pair of sidewardly extending stub shafts 300 and 302 (FIG. 12) which are secured to the housing 270 at either side thereof by means of the bolts 304, the stub shafts 300 and 302 being mounted in the bearings 306 and 308 provided in ear portions 272 and 274, respectively, so that the housing 274 is pivotally mounted for movement along the elbow axis 92 at the upper end of the shoulder arm portion 84. The stub shafts 300 and 302 are also provided with inwardly opening recesses 310 and 312 (FIG. 12) which act as support bearings for the independently movable gearing indicated generally at 314, which is associated with the shafts 244 extending upwardly through the opening 298 in the shoulder arm portion 84, the gearing 314 being shown in more detail in FIGS. 14 to 16, inclusive. A retaining nut 316 is provided for each of the stub shafts 300 and 302, and end caps 318, which cover the ends of the stub shafts 300 and 302, are secured to the ear portions 272 and 274 by means of the bolts 320. Accordingly, the housing 270 is accurately mounted for pivotal movement about the elbow axis 92 while permitting independent movement of the gearing 314 about the axis 92 so that movement for the three outer axes may be transmitted through this gearing and through the housing 270 to the forearm twist portion 94 and the manipulator hand 96.

Considering now in more detail the gearing 314, a shaft 322 (FIG. 15) is provided with end rings 324 and 326 which are positioned within the recess 310 and 312 of the stub shafts 300 and 302 (FIG. 12) and a series of three beveled ring gears 328, 330 and 332, having teeth on both sides thereof, are rotatably mounted on the shaft 322 by means of the bearings 334, 336 and 338. A first casting member 340 is provided with a downwardly and rearwardly extending ear portion 342 which is fixed to the upper end of the shoulder arm portion 84 by means of a pin 344 (FIG. 12) which passes through an opening 346 (FIG. 14) in the ear portion 342 so that the casting 340 is fixed to and moves with the shoulder arm portion 84. The casting 340 acts as a support for a plurality of rotatable input shafts 348, 350 and 352 which are connected to the upper ends of the screw shafts 244 by means of the universal couplings 354 (FIG. 6). The input shaft 348, 350 and 352 carry input beveled pinions 356, 358 and 360 which are in engagement with the beveled teeth on one side of the ring gears 328, 330 and 332. A second casting 362 is also rotatably mounted on the shaft 322 and is provided with an ear portion 364 which is secured to the elbow housing 270 by means of a pin 366 (FIG. 12) so that the casting 362 is fixed to and moves with the housing 270 as this housing is pivoted around the elbow axis 92. The casting 362 acts as a support for a plurality of rotatable output shafts 368, 370 and 372 which carry beveled gears in engagement with the teeth on the opposite side of the beveled ring gears 328, 330 and 332. Accordingly, when any one of the input shafts 348, 350 or 352 is rotated, the corresponding output shaft 368, 370 or 372 is rotated through the intermediate double-sided beveled ring gear 328, 330 or 332, while at the same time the output shafts may be rotated on the shaft 322 with respect to the input shafts as the housing 70 is pivoted around the elbow axis 92.

Considering now the manner in which the input shaft 350 is employed to rotate the forearm portion 94 about the axis of the elbow arm portion 90 to effect the so-called forearm twist motion referred to previously, the output shaft 370, which is interconnected with the input shaft 350 through the ring gear 330, carries a drive pinion 374 (FIG. 17) which is in mesh with a gear 376 which is carried by a shaft 378 which is rotatably mounted in a boss portion 380 of the housing 270 by means of the bearings 382 and 384. The shaft 378 has formed in the end thereof another pinion gear 386 which is in mesh with an idler gear 388 secured to the end of a shaft 390 which is rotatably mounted in a member 392 which is secured to the housing 270 by means of the bolts 394 (FIG. 18), the shaft 390 being mounted within the member 392 by means of the bearings 396 and 398. The forearm portion 94 comprises a generally cylindrical hollow portion 400 (FIG. 11) which is rotatably mounted within the housing 270 by means of the bearings 402 and 404, the forearm portion 94 including a tapered outer portion 406 which terminates in a transverse end plate 408 to which the hand gearing mechanism indicated generally at 410 is secured. The elbow arm housing 270 includes an end ring 412 which is secured to the end of the housing 270 by means of the bolts 414, the ring 412 defining an air passageway 416 (FIG. 11) between the ring 412 and the forearm portion 94, a pair of O rings 418 and 420 being employed to provide an airtight fit between the ring 412 and the forearm housing 400, 406 so that the forearm housing may be rotated with respect to the ring 412 while maintaining an airtight seal. Compressed air may then be supplied through the fitting 422 (FIG. 13) to the ring 412 and is supplied through a passageway 424 in the conical portion 406 of the forearm housing 94 to an air fitting 426 secured to the exterior of this housing. Compressed air for actuating the gripper members in the manipulator hand is thus conducted through the rotatable forearm portion 94, it being understood that air from a suitable compressed air supply is supplied to the fitting 422 through a flexible hose 428.

Referring again to the manner in which the forearm portion 94 is rotated with respect to the elbow portion 90, the cylindrical housing portion 400 is provided with an internal ring gear 430 (FIGS. 11 and 17) which is in mesh with the idler gear 388, the gear 388 being carried by the housing 270, as described heretofore. Accordingly, when the output shaft 370 of the gearing 314 is rotated, the forearm housing portion 400 is rotated through the gears 374, 376, 386, 388 and 430.

Considering now the manner in which the other two output shafts 368 and 372 of the gearing 314 are employed to effect the wrist bend and wrist swivel actions described generally heretofore, it is pointed out that all three of the output shafts of the gearing 314 extend through an opening 432 (FIG. 11) in the elbow housing 270 and the output shafts 368 and 372 (FIG. 15) are connected through universal couplings 434, shafts 436 and universal couplings 438, within the interior of the tapered forearm housing 400, 406 to two splined shafts 440 and 442 (FIG. 19) which are mounted in the end plate 408 of the forearm portion 94. The hand gearing mechanism 410 is mounted to the end plate 408 by means of the bolts 444 so that this mechanism rotates with the forearm portion 94. Since the two shafts 440 and 442 are offset from the central axis of the forearm portion 94 the portions of the universal couplings 438 are provided with splined end portions mating with the splined shafts 440 and 442 so as to permit a limited movement of the universal couplings 438 along the length of the shafts 440 and 442 as the forearm portion 94 is rotated through 300 degrees in the forearm twist axis.

Figure 19:
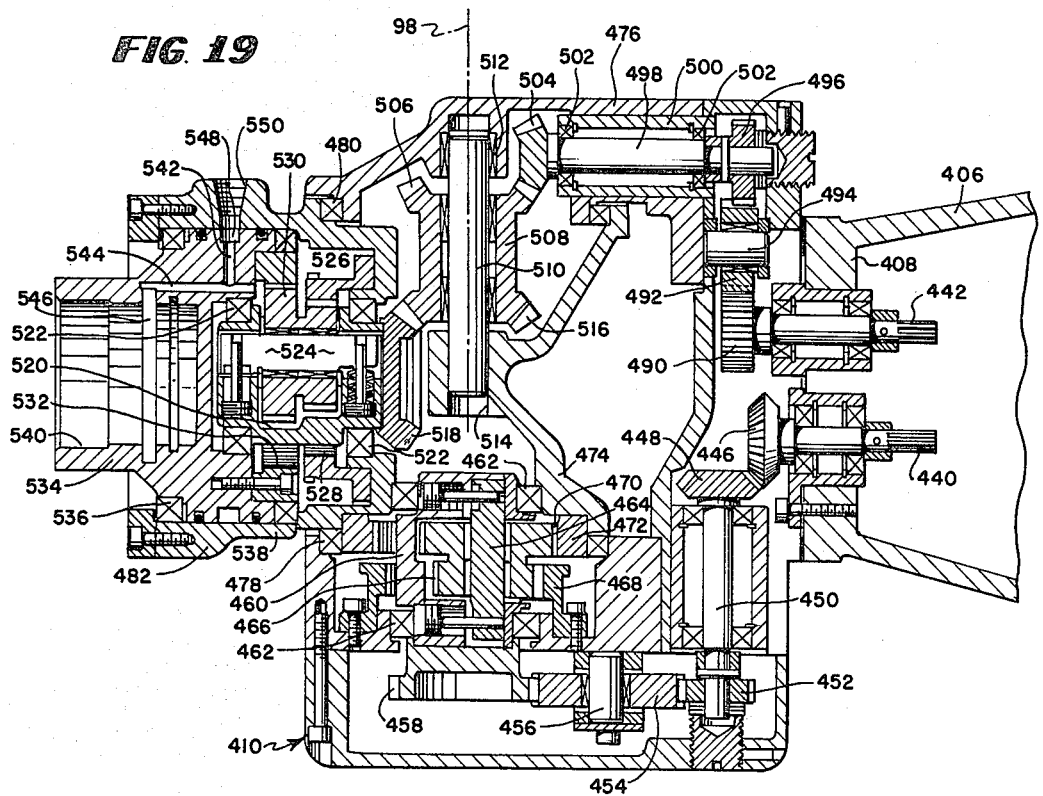
FIG. 19 is a sectional plan view of the manipulator hand portion of the manipulator shown in FIG. 11.
Figure 21:
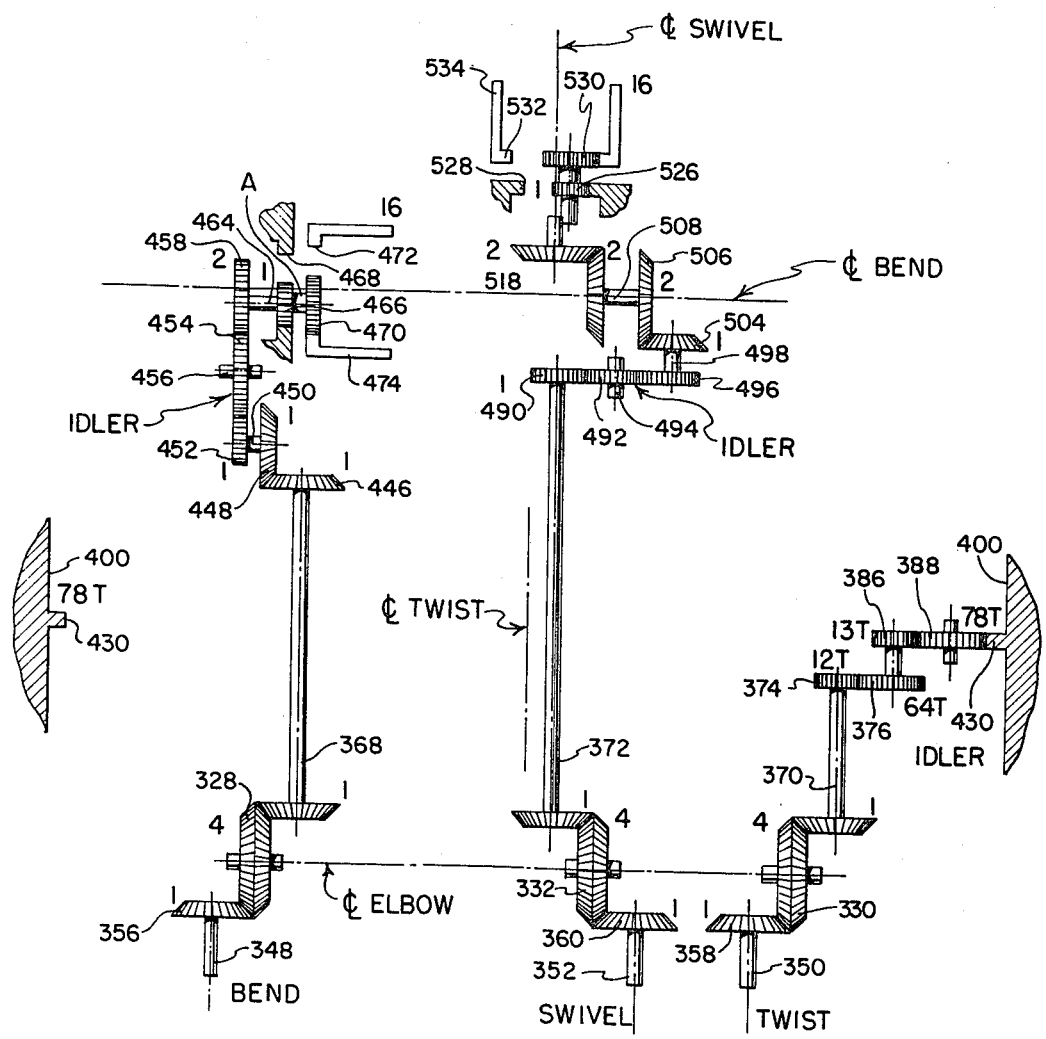
FIG. 21 is a diagrammatic view of the gear drive trains of the manipulator of FIG. 6.
Figure 22:
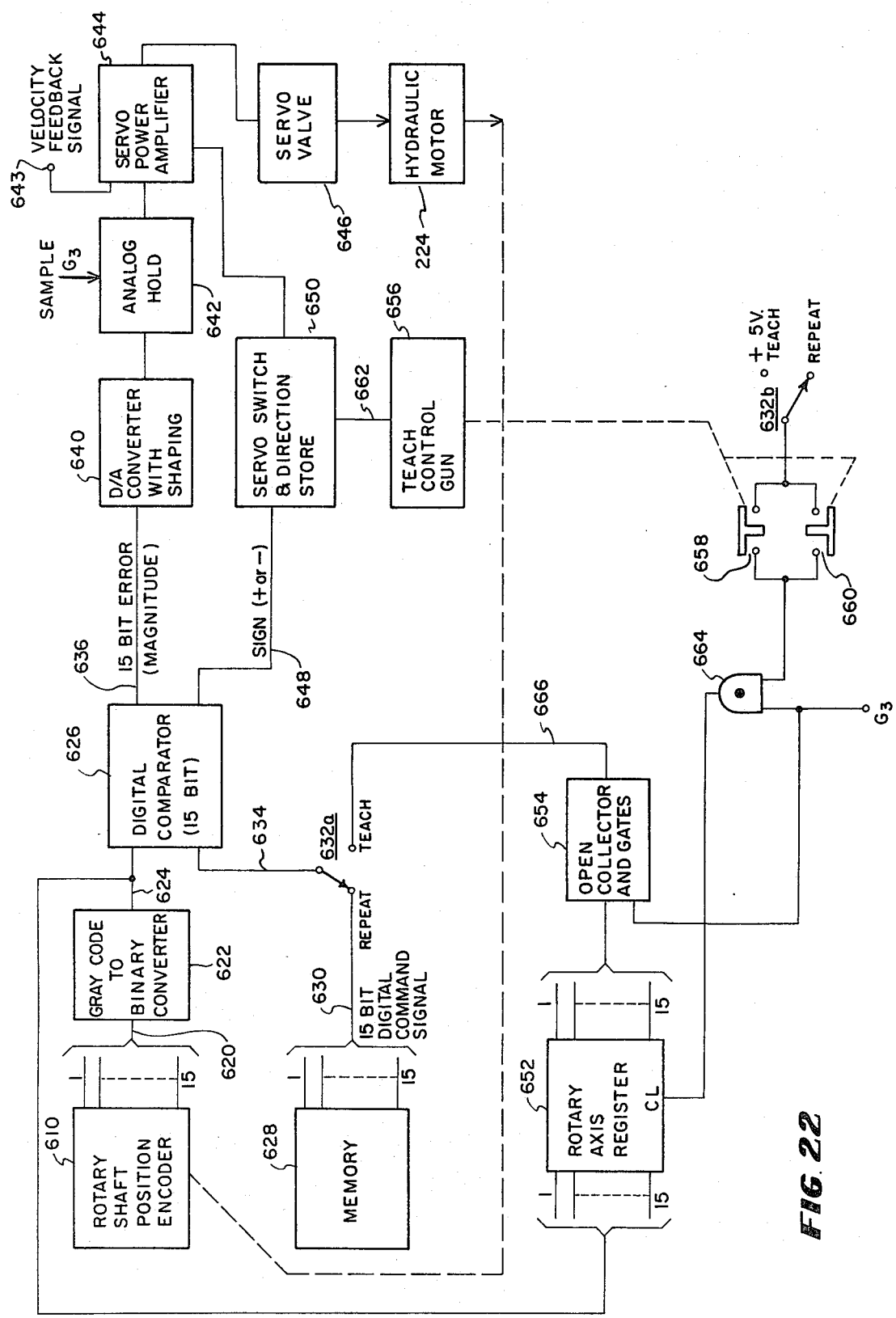
Figure 24:
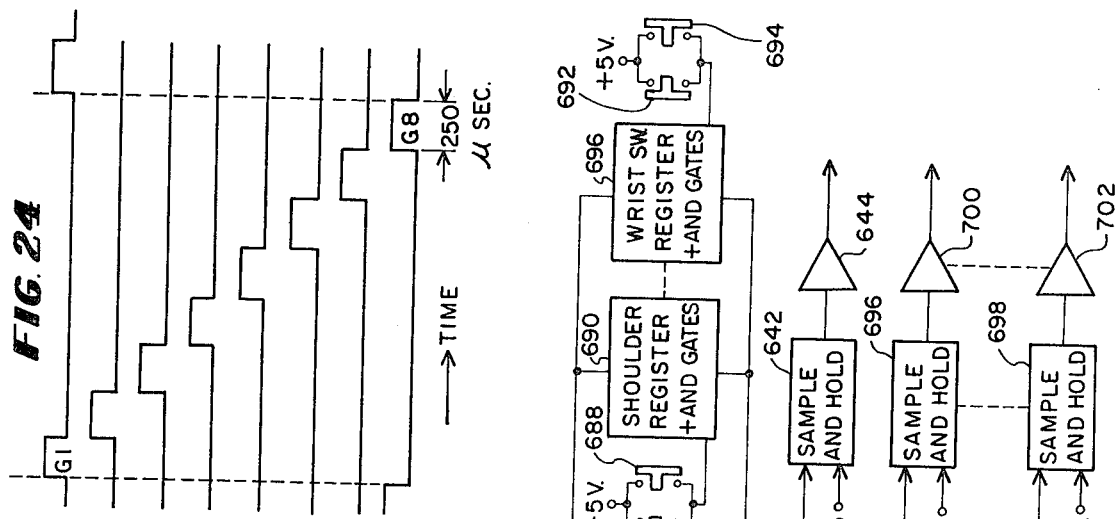
Figure 23:
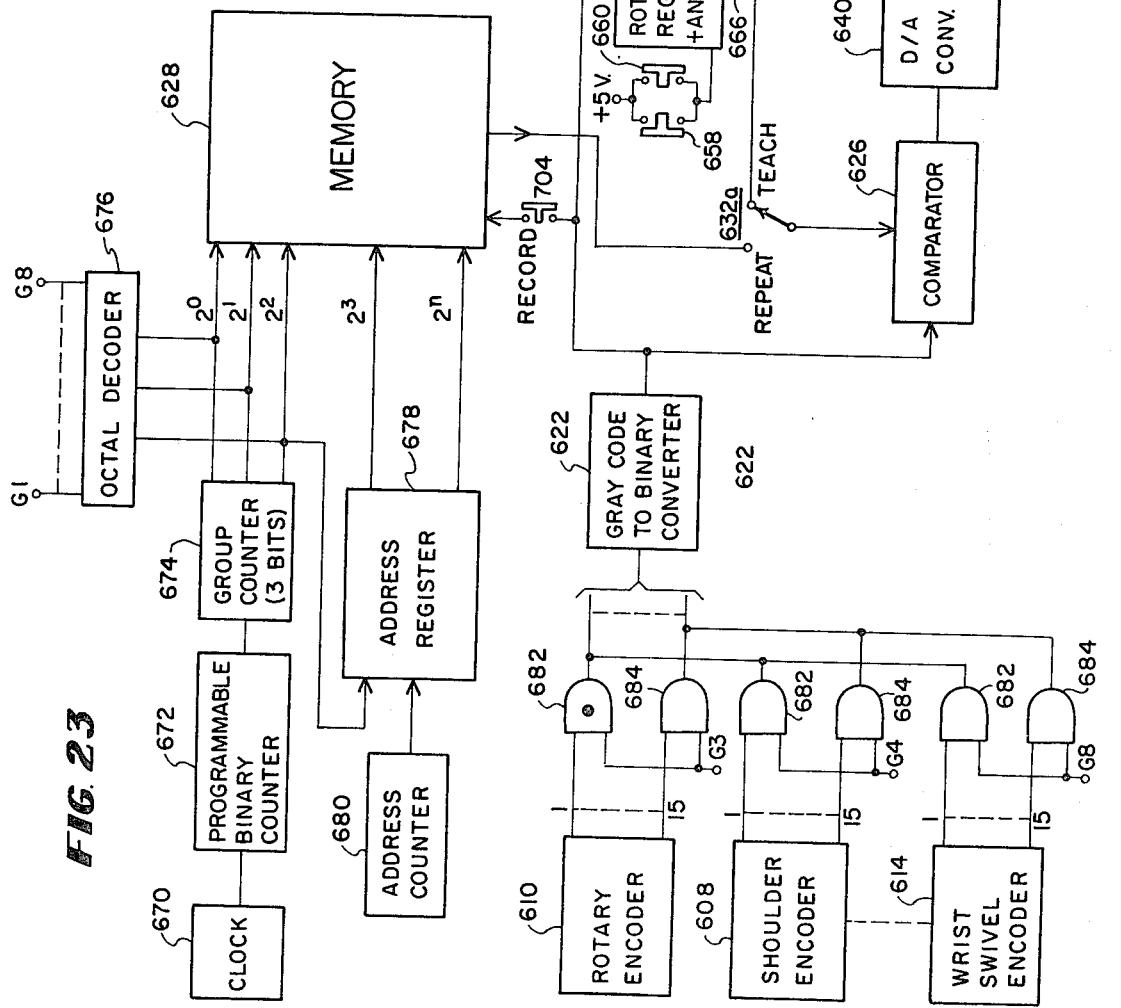
Figure 25:
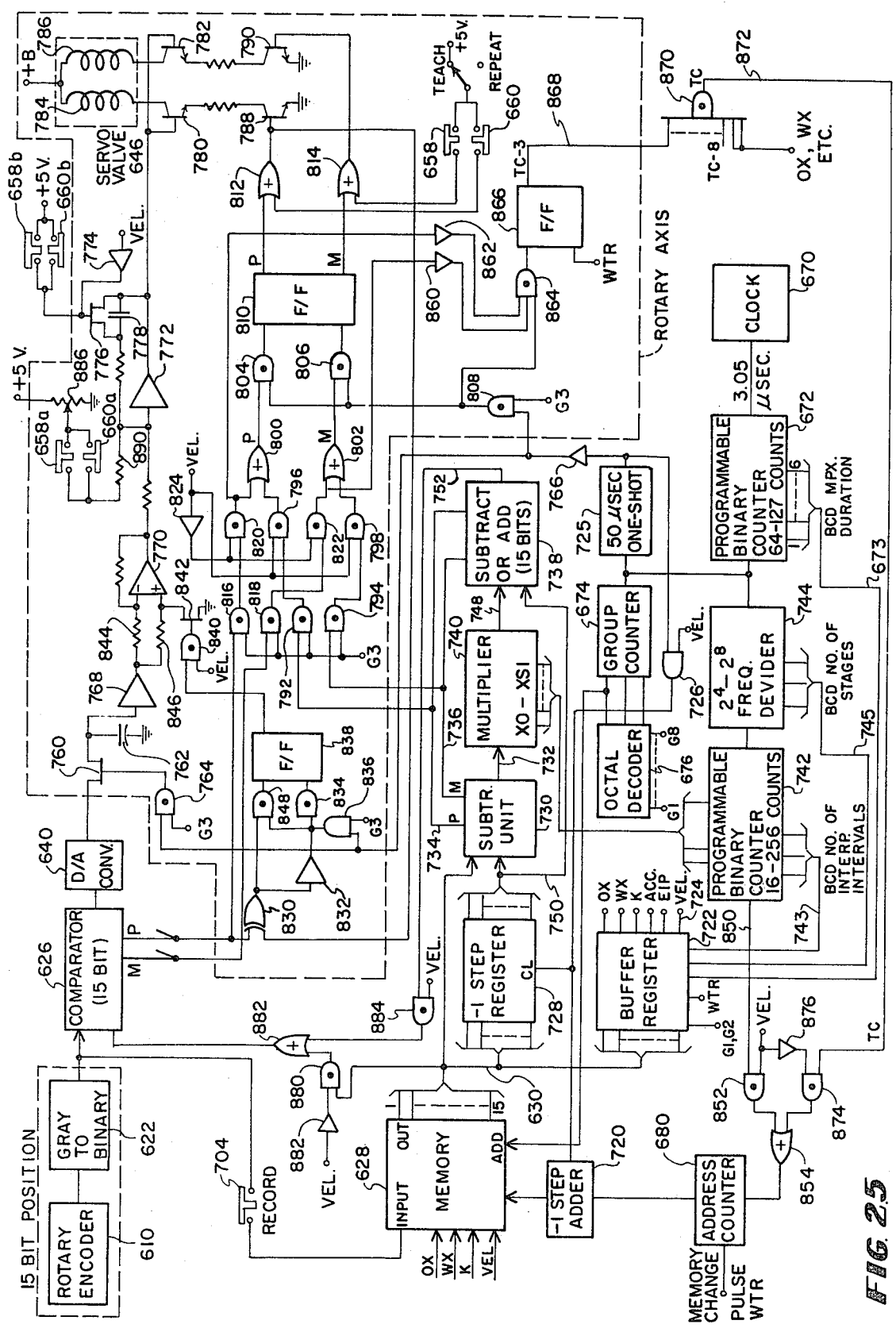
Figure 26:
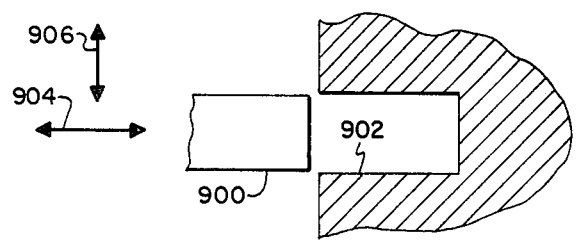
Figure 27:
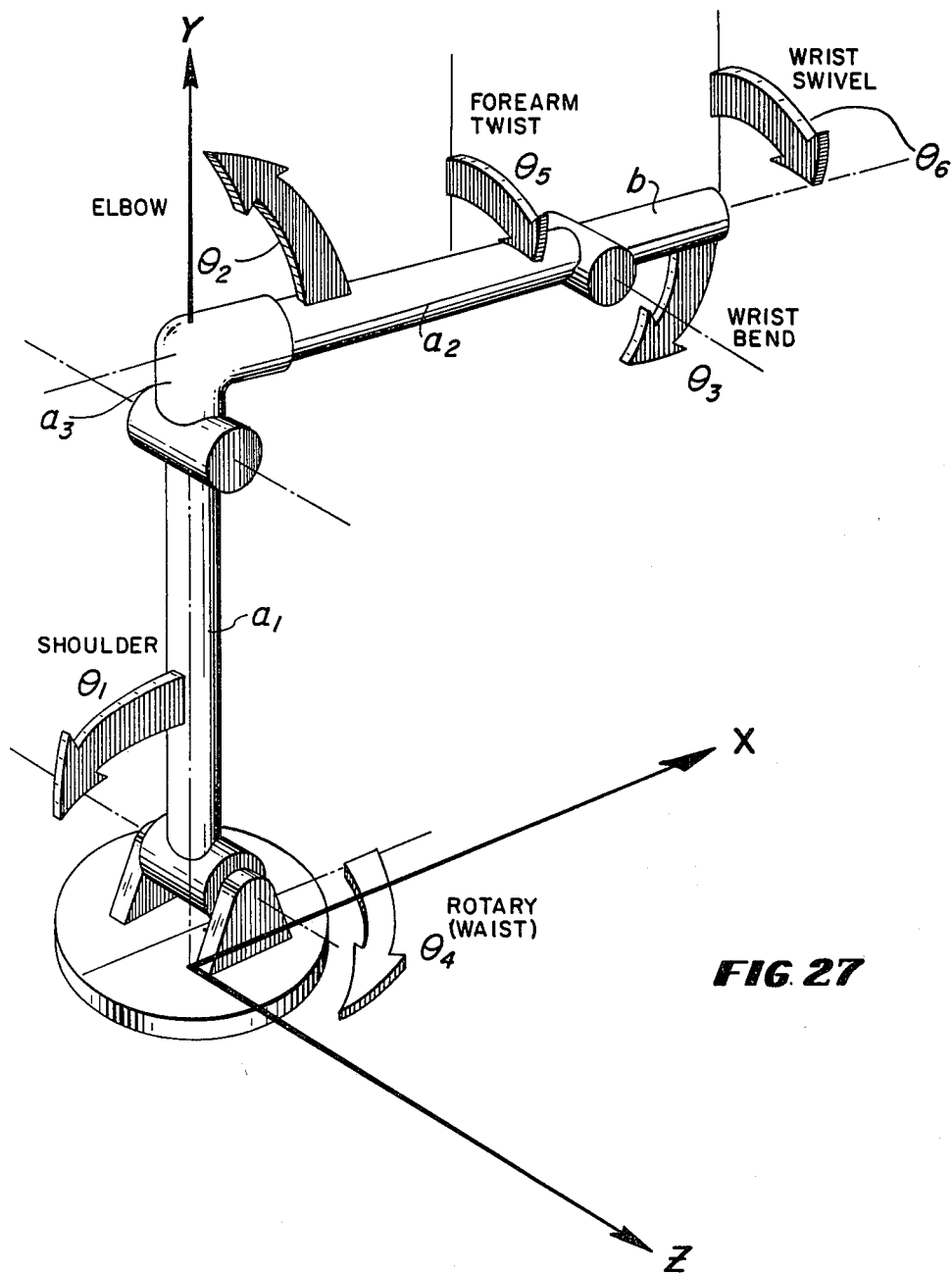
Figure 28:
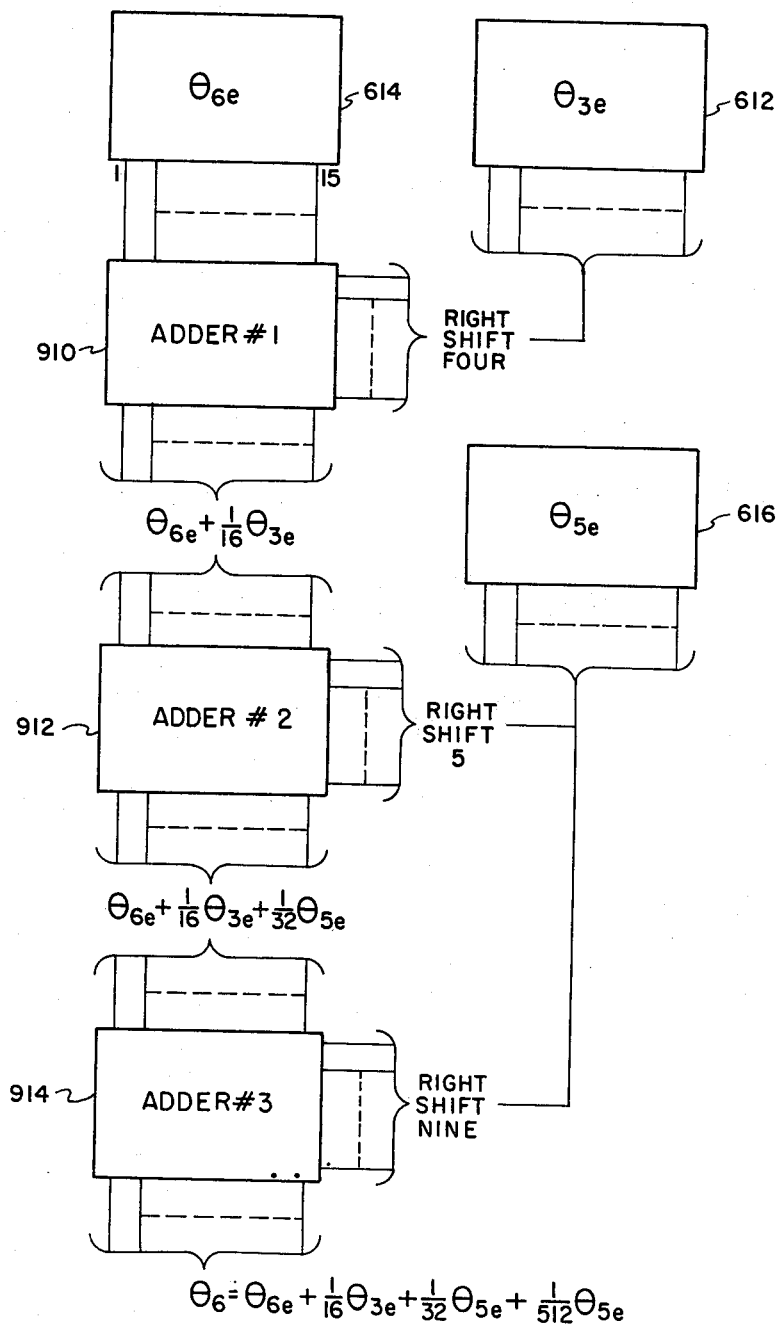
Figure 29:
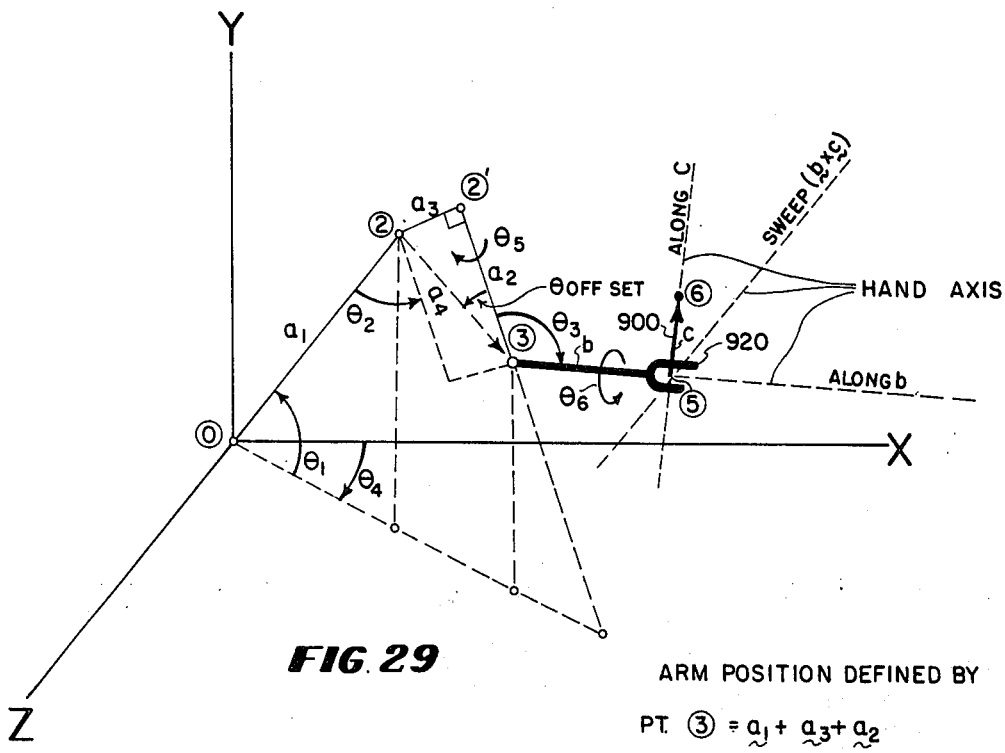
Figure 30:
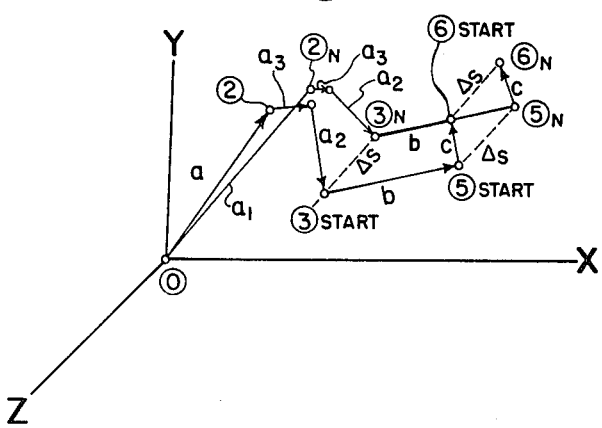
Figure 31:
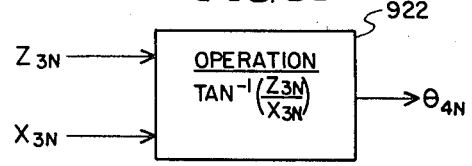
Figure 32:
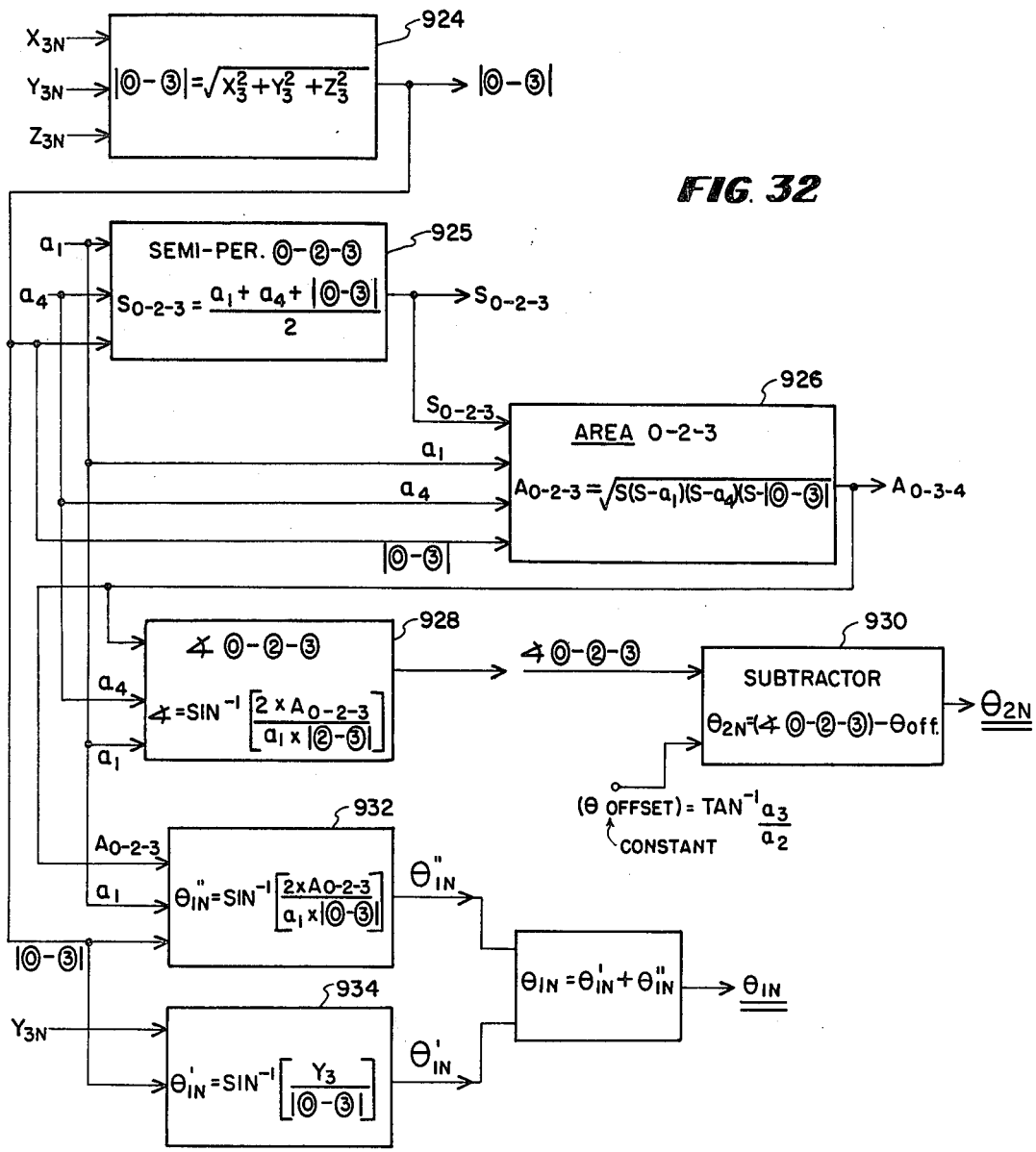
Figure 33:
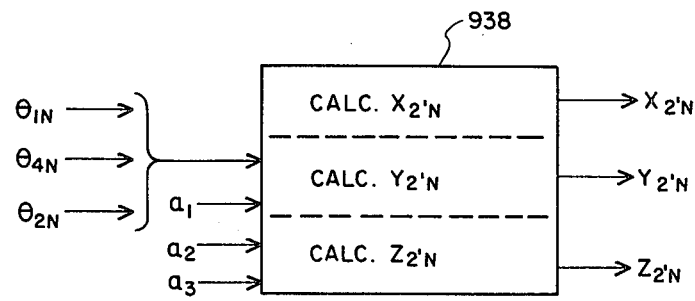
Figure 34:
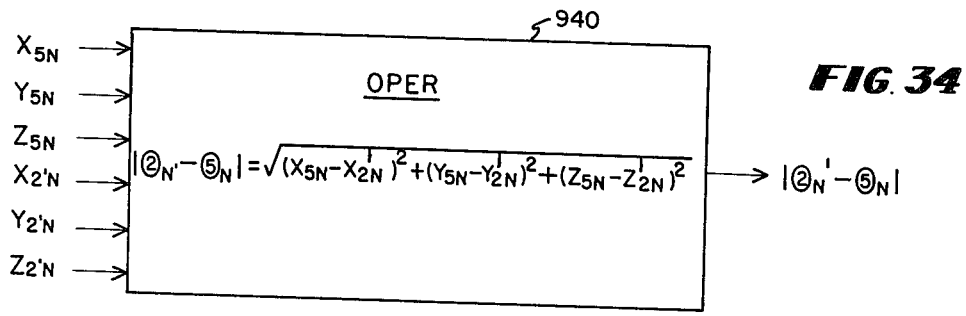
Figure 35:
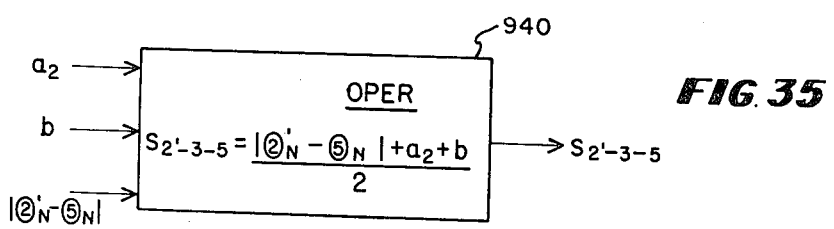
Figure 36:
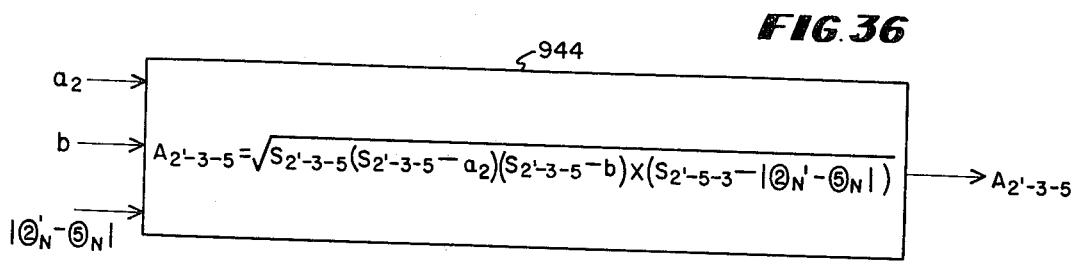
Figure 37:
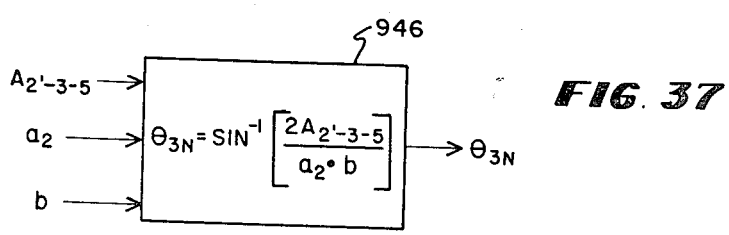
Figure 38:
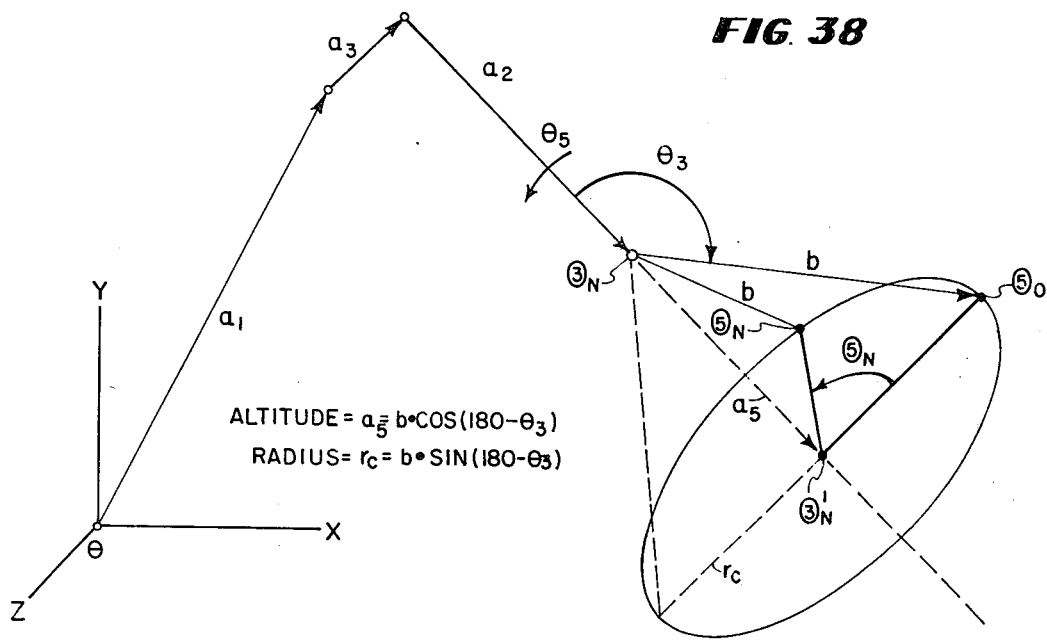
Figure 39:
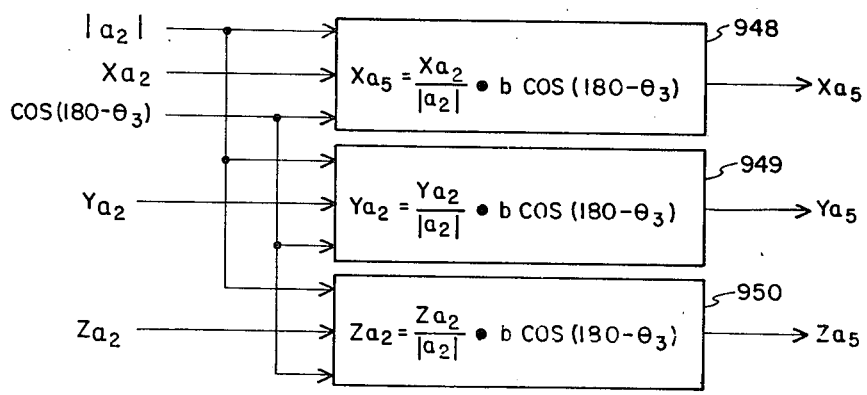
Figure 39A:
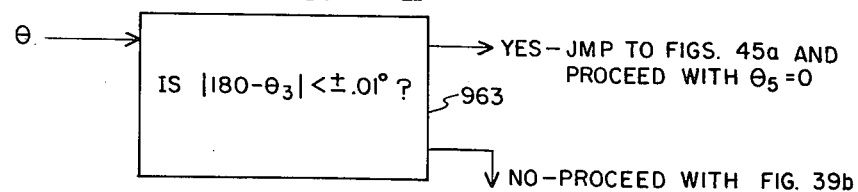
Figure 39B:
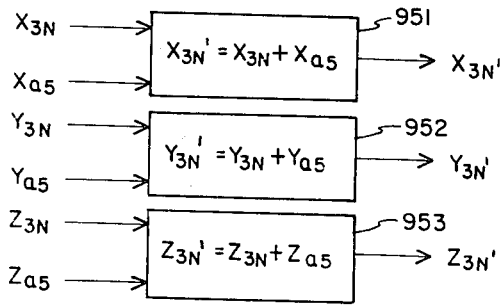
Figure 39C:
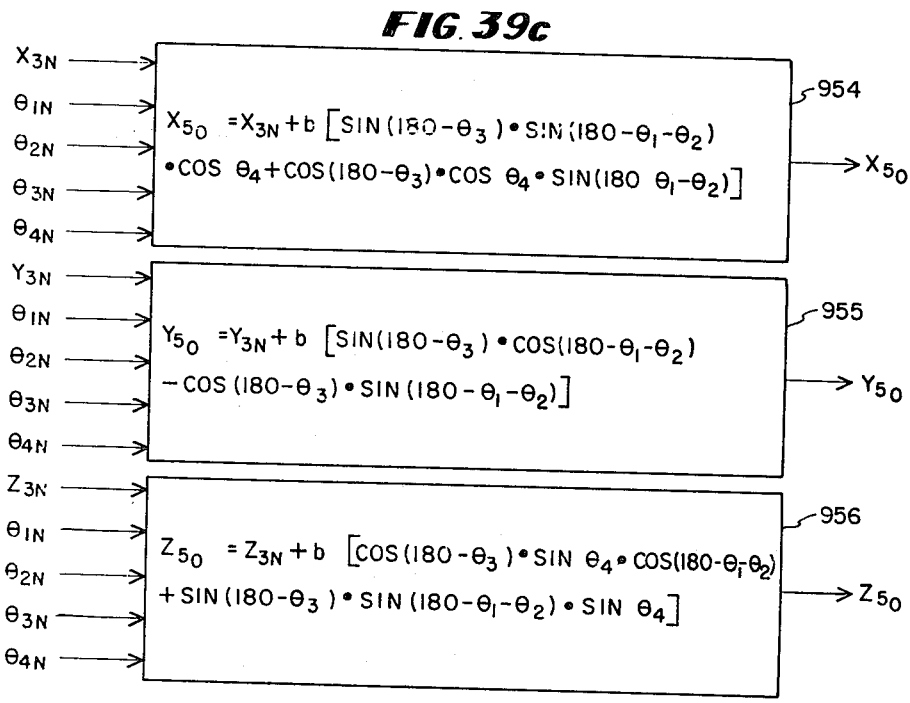
Figure 40:
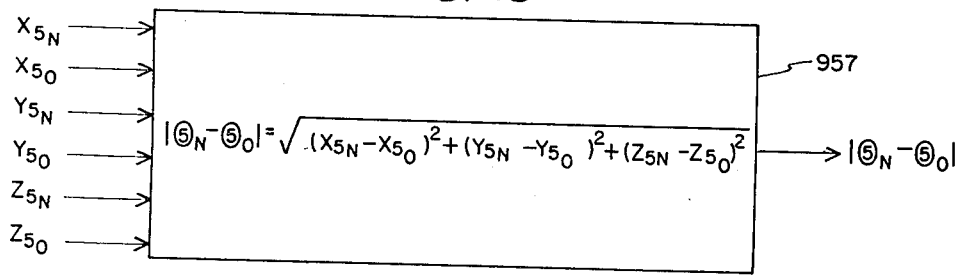
Figure 41:
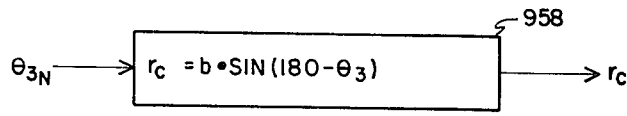
Figure 42:
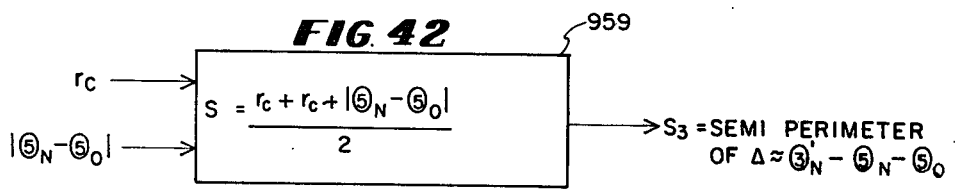
Figure 43:
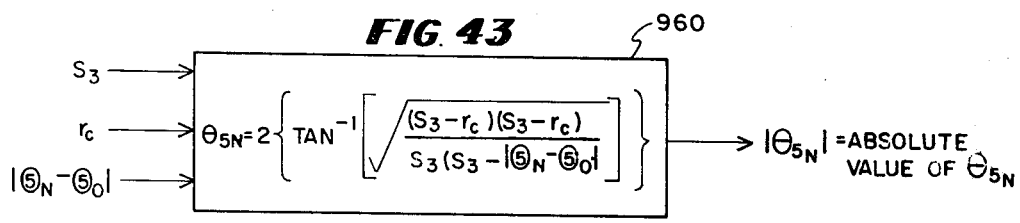
Figure 43A:
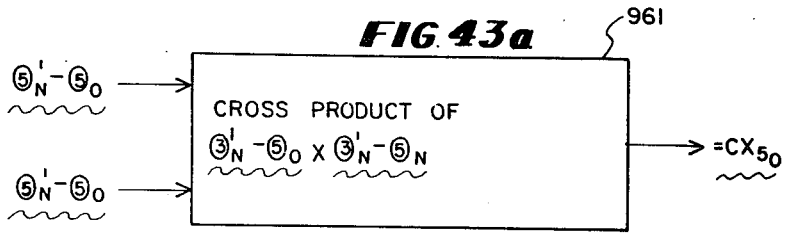
Figure 43B:
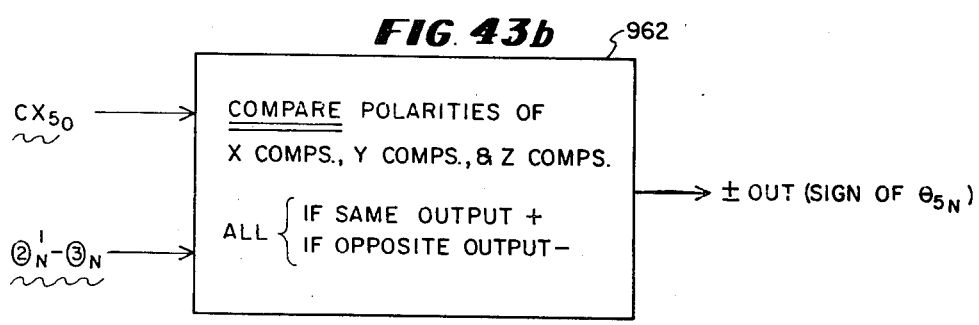
Figure 46:
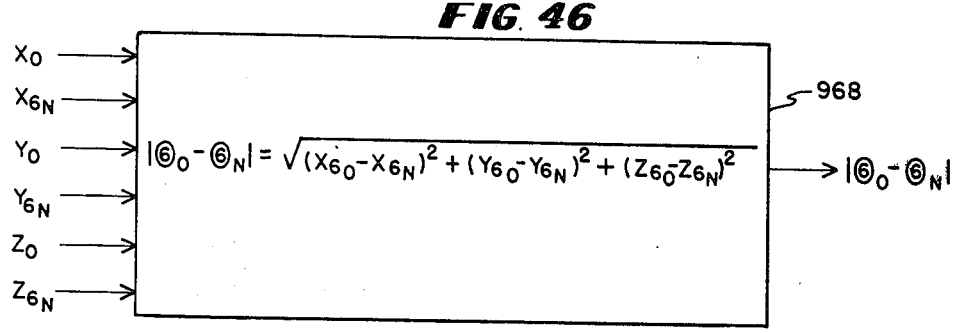
Figure 47:
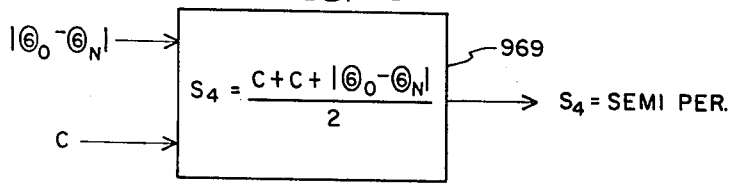
Figure 48:
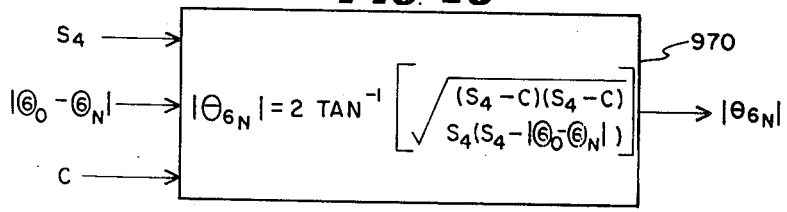
Figure 48A:
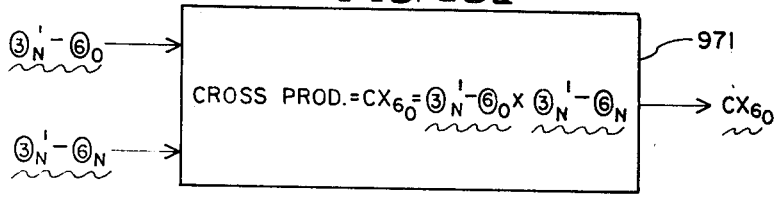
Figure 48B:
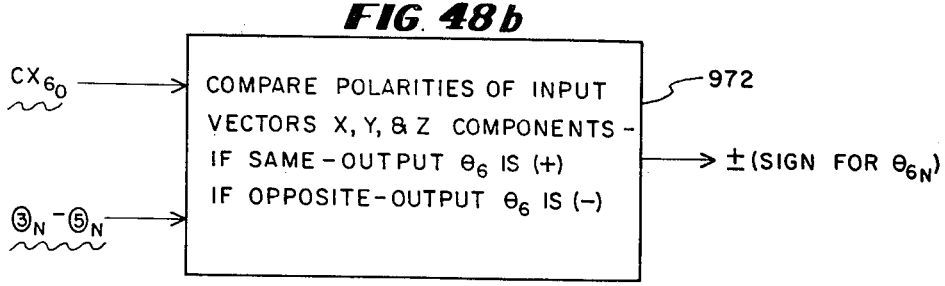
Figure 49:
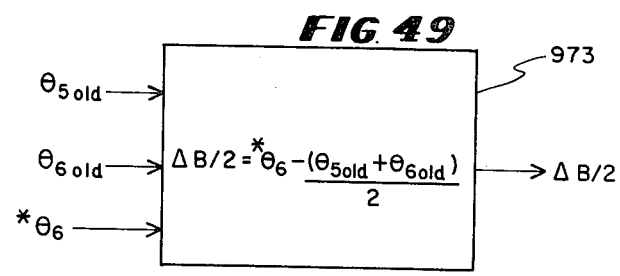
Figure 49A:
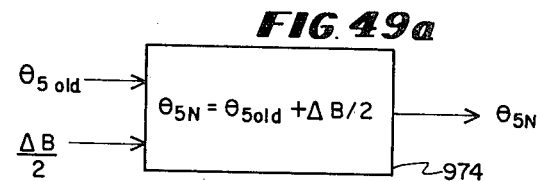
Figure 49B:
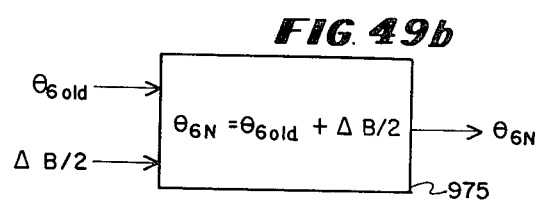
Figure 51:
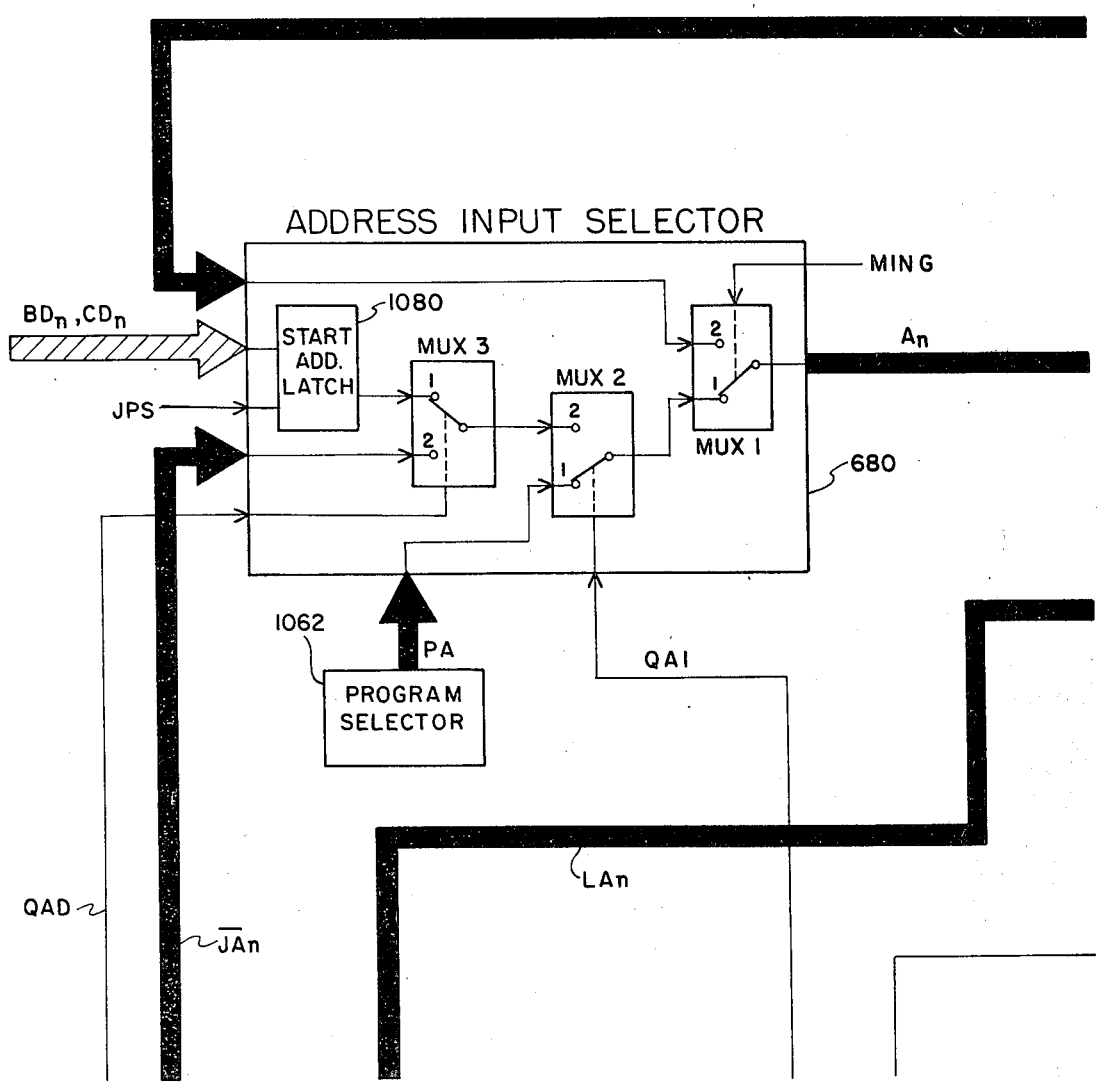
Figure 52:
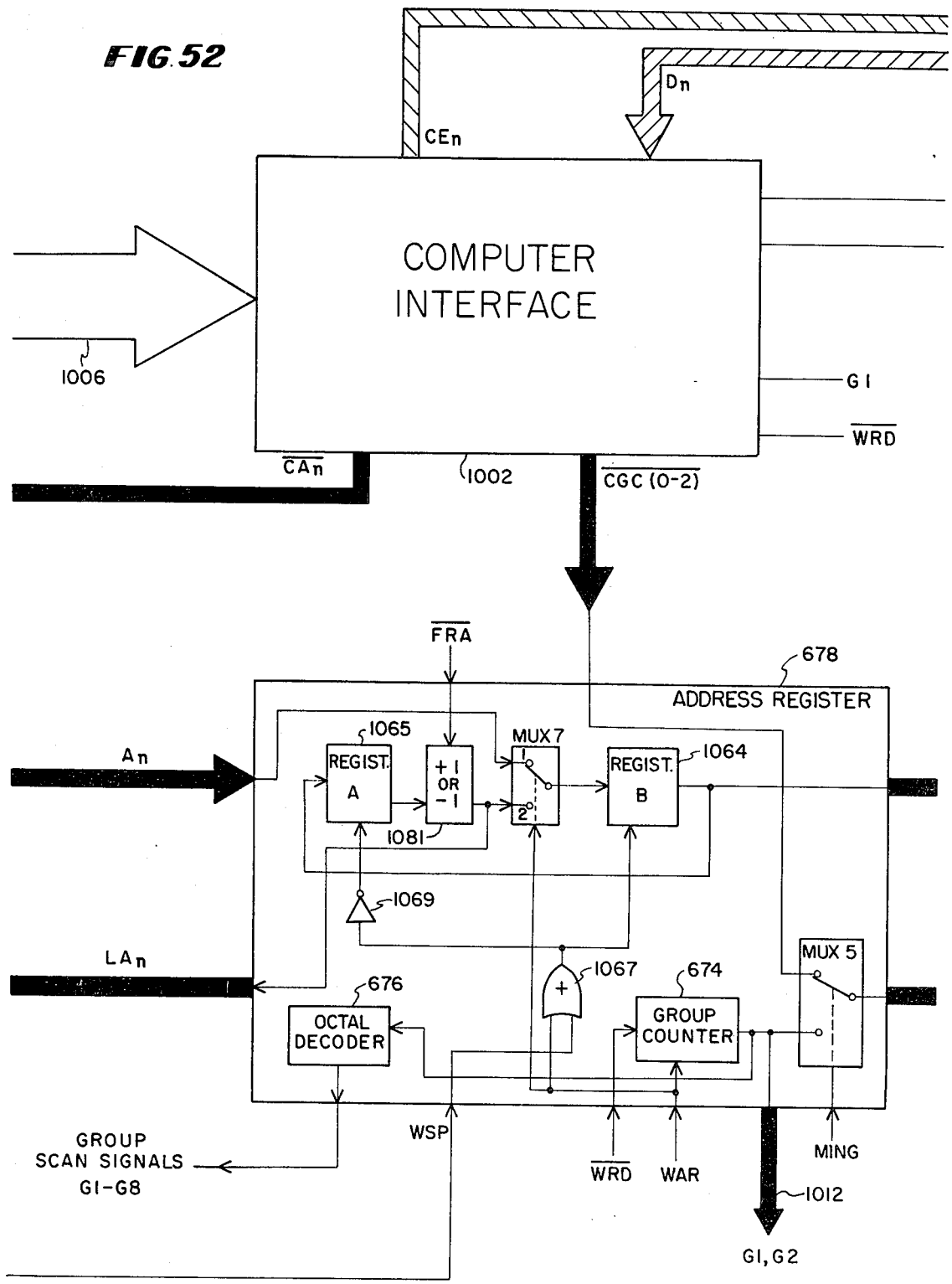
Figure 53:
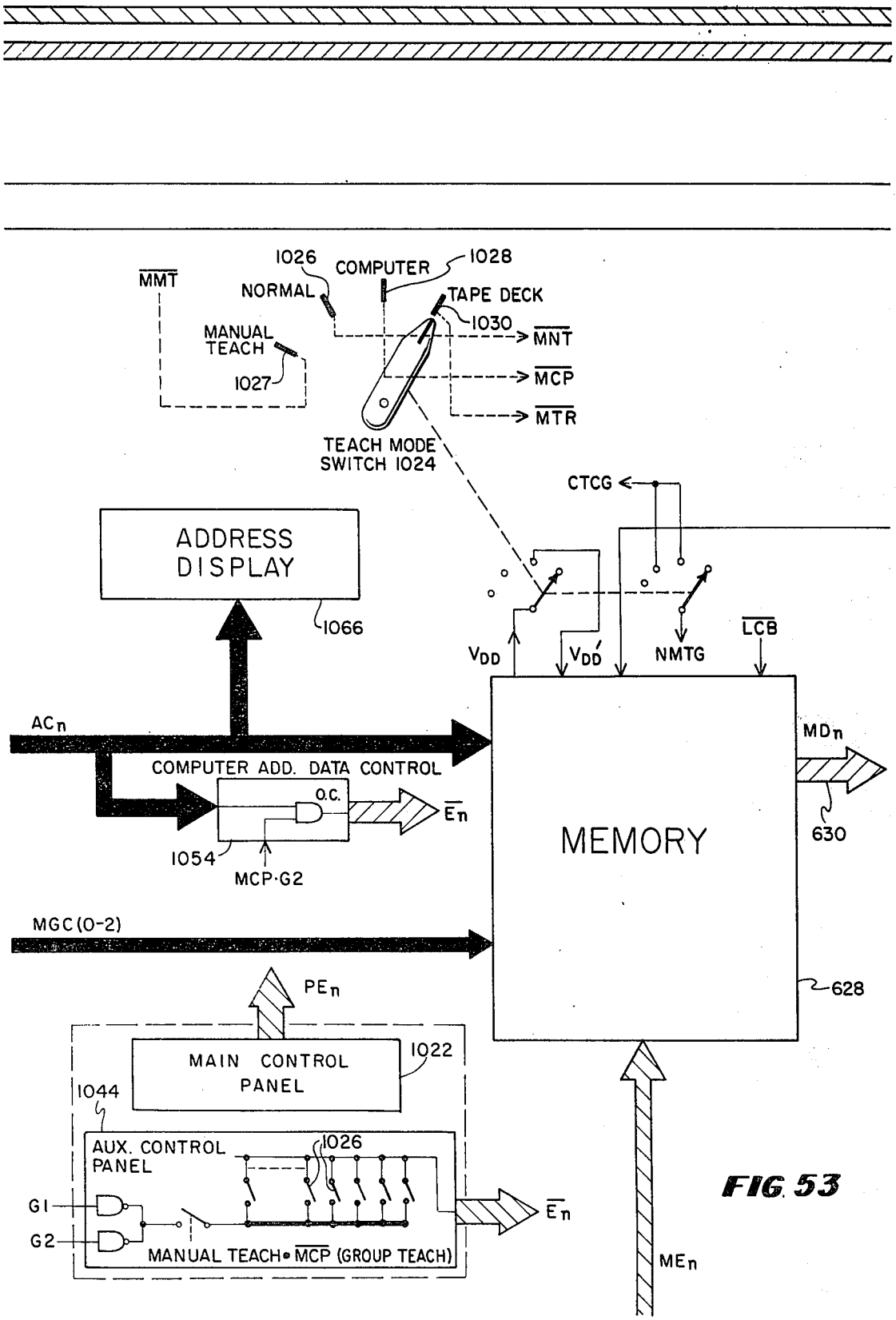
Figure 54:
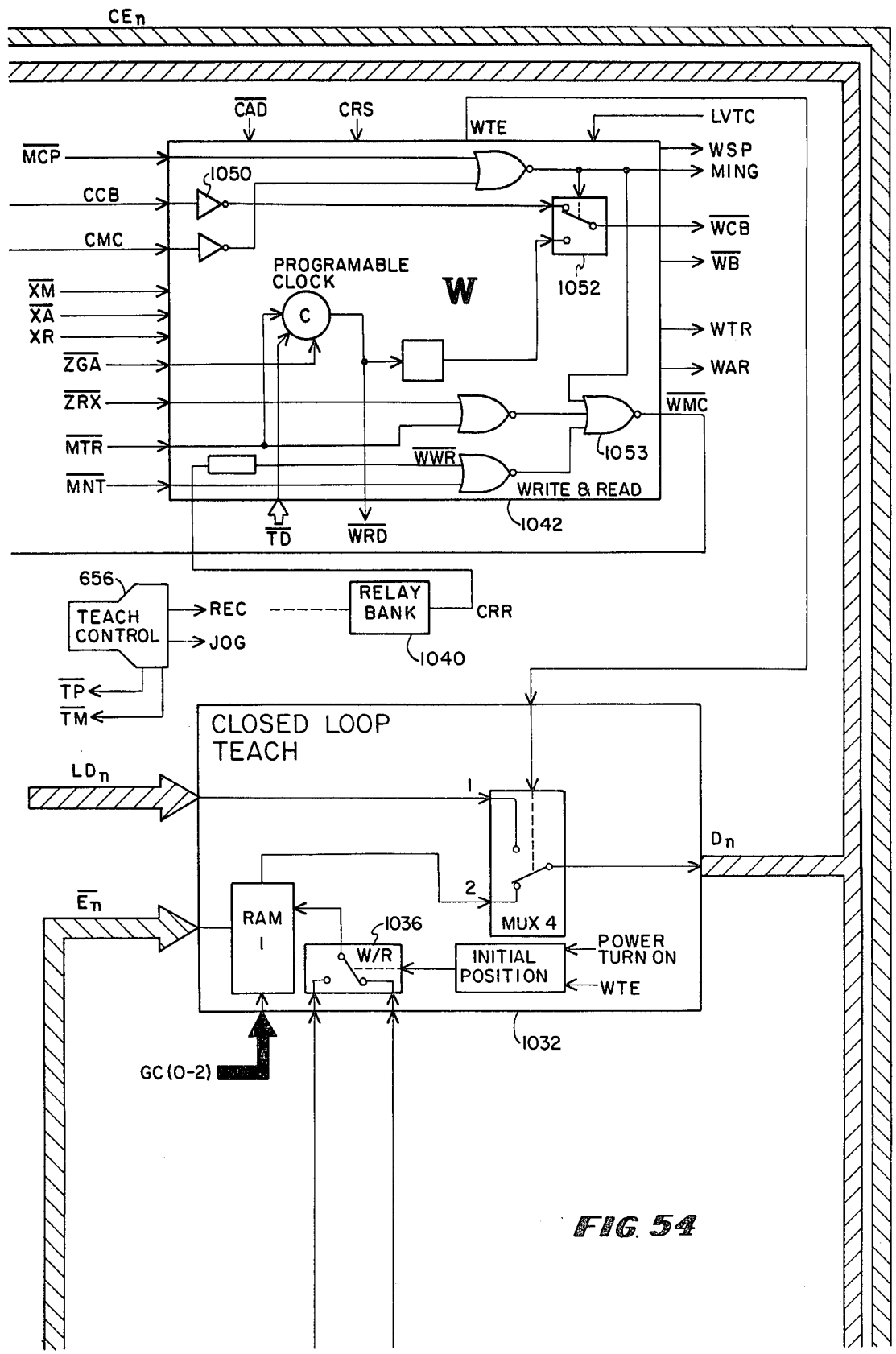
Figure 55:
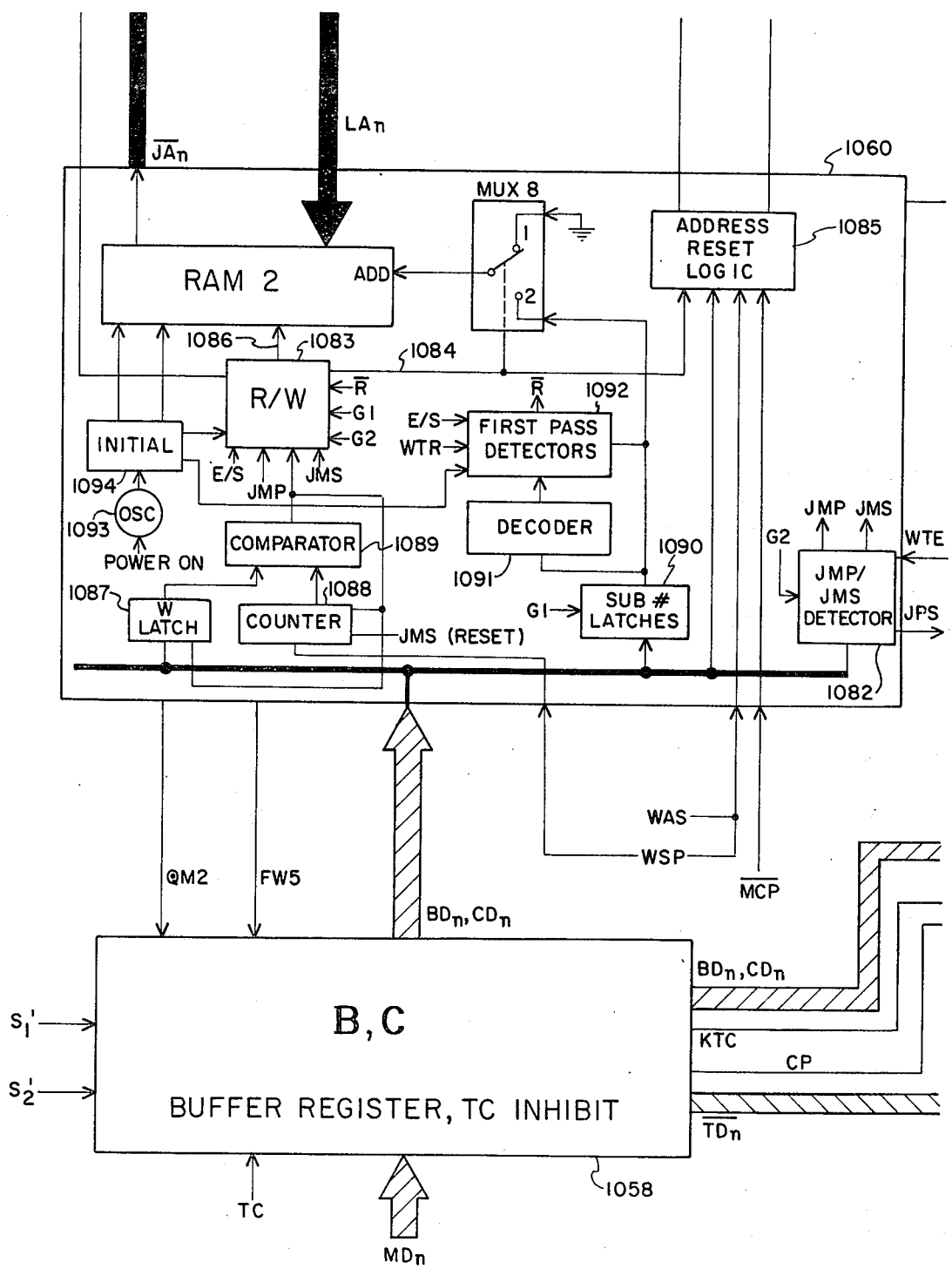
Figure 56:
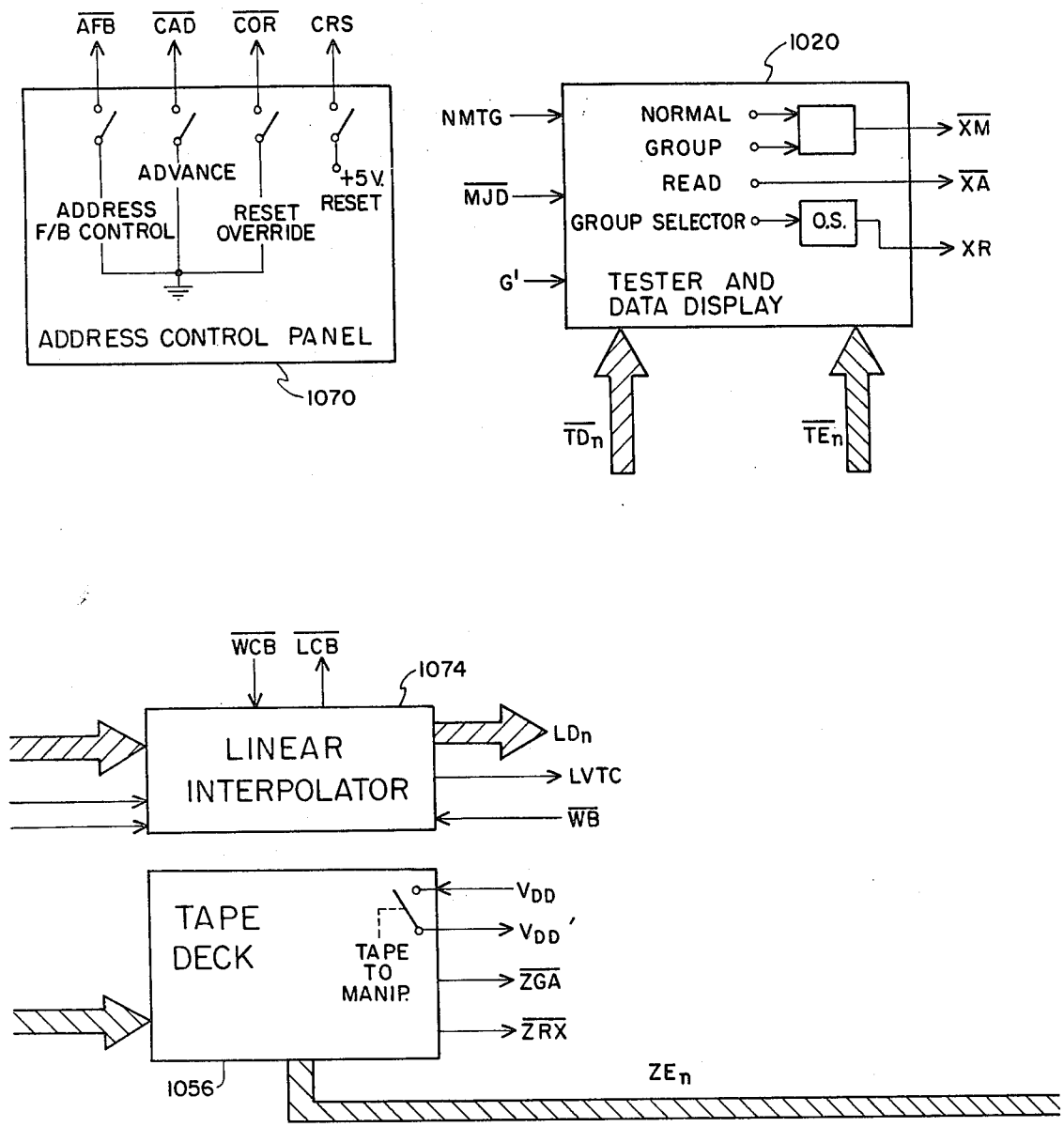
Figure 57:
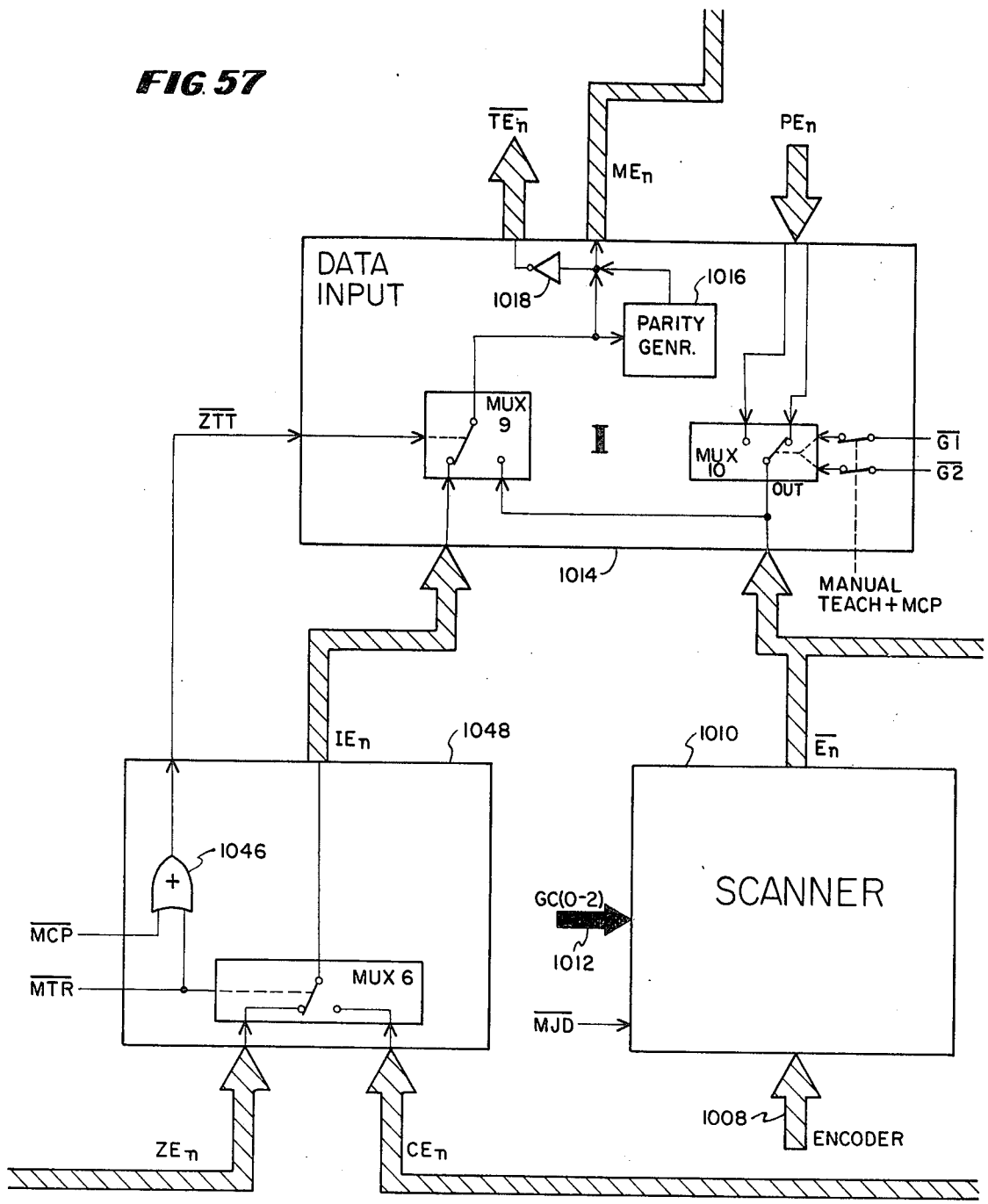
Figures 58, 58A:
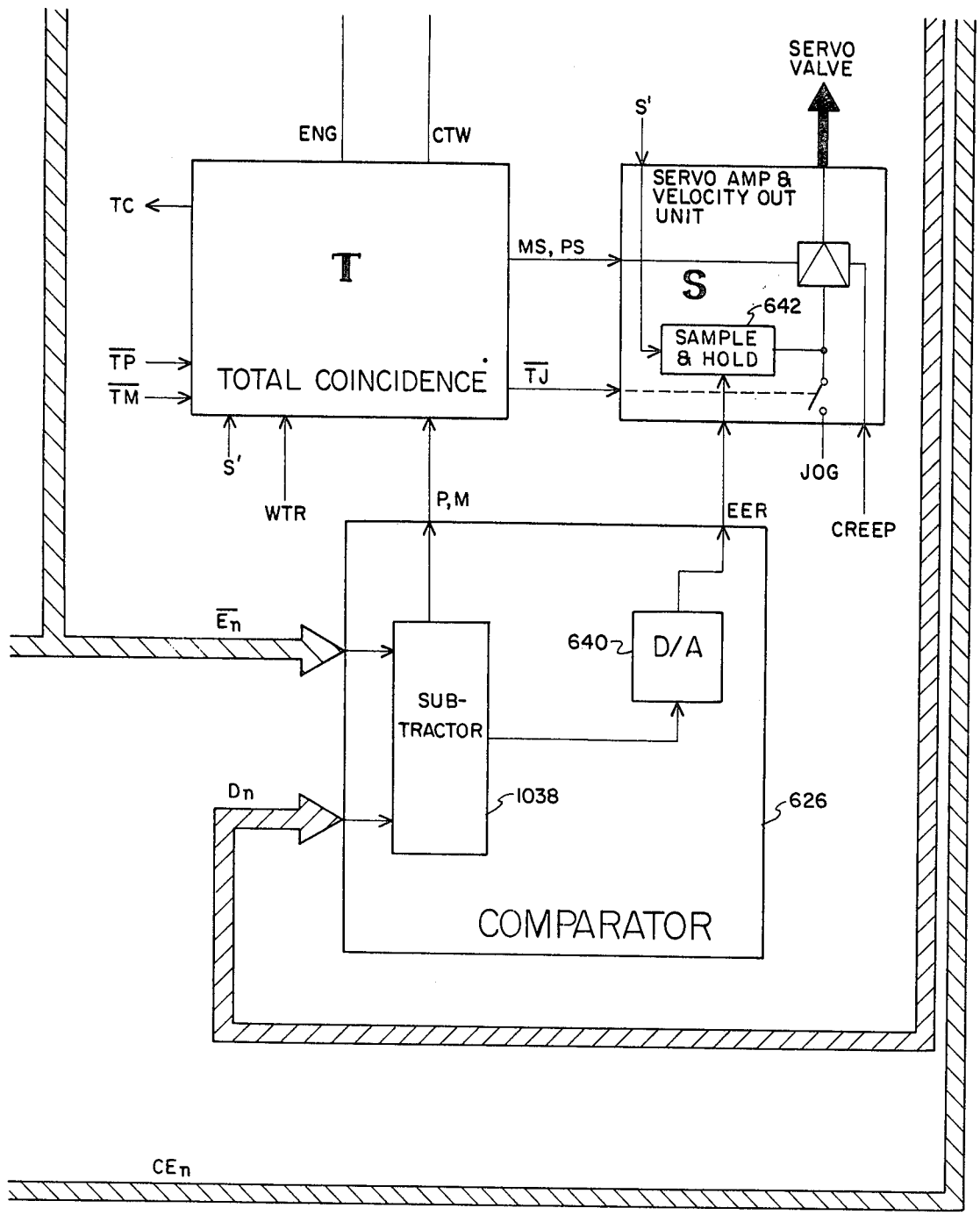
Figure 59:
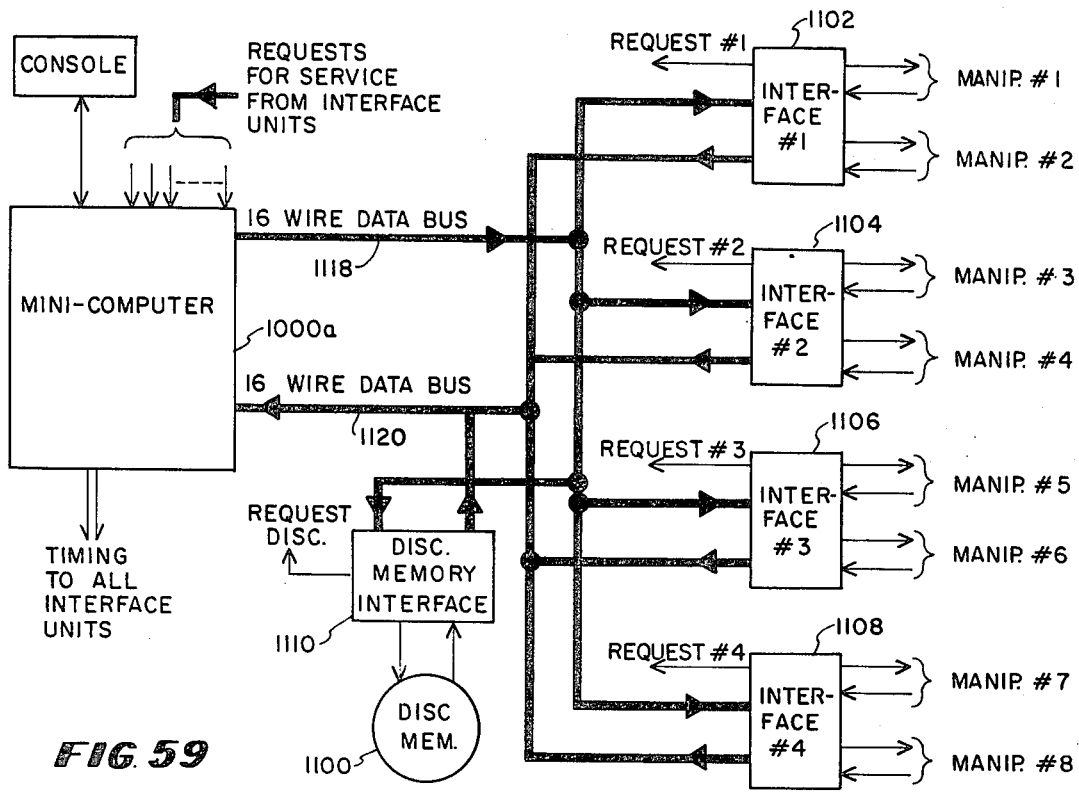
Figure 60:
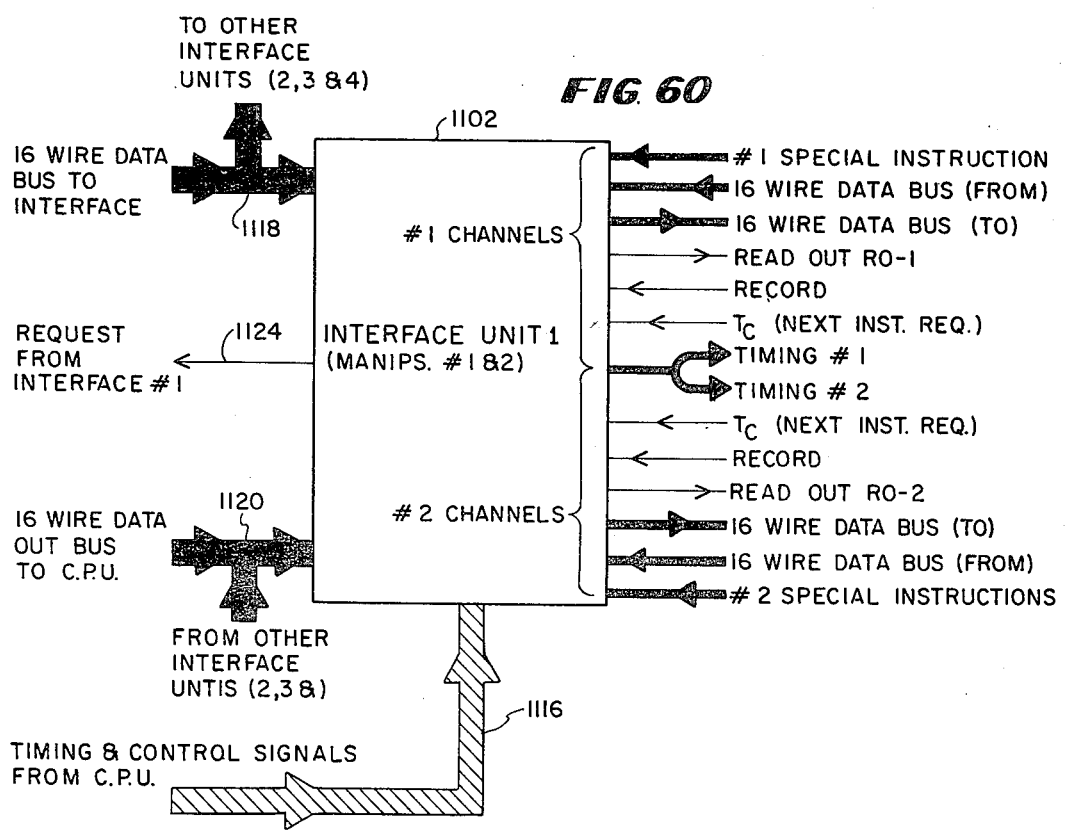
Figure 61:
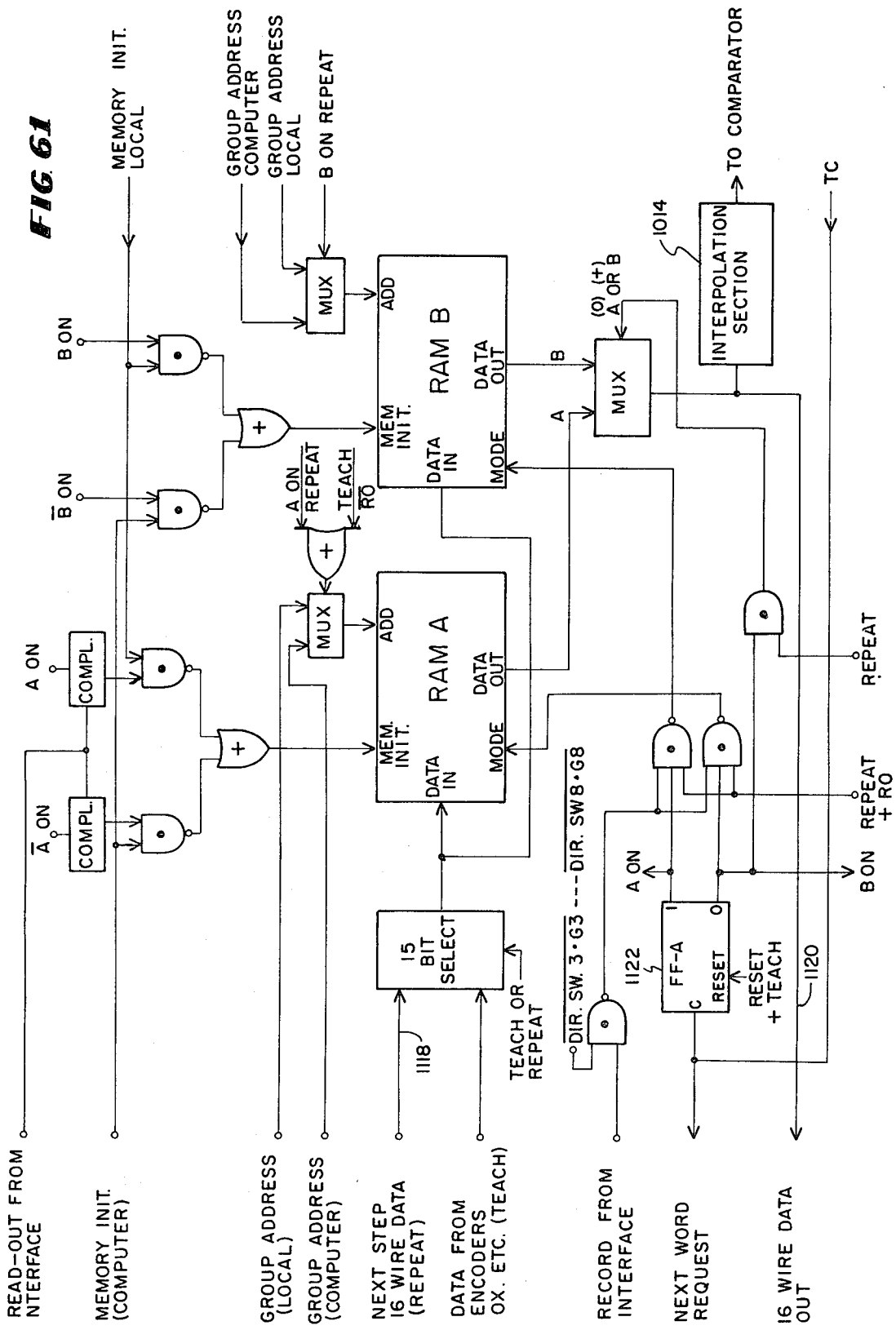

The hand gearing mechanism 410 is shown in FIG. 19 and is illustrated diagrammatically in FIG. 21. A beveled gear 446, which is connected to the splined shaft 440, engages a mating beveled gear 448 carried on the end of a transverse shaft 450. A gear 452 is positioned on the other end of the shaft 450 which is in mesh with an adjustable idler gear 454 rotatably mounted on an idler shaft 456. The idler gear 454 is connected to the input gear 458 of a planetary drive unit 460 which is rotatably mounted in the bearings 462 and includes an offset shaft 464 on which is mounted a gear 466 in engagement with a fixed internal toothed ring gear 468 and a second gear 470 which is in engagement with an internal toothed ring gear 472 which is connected to the wrist bend output member 474. The output member 474 is rotatably mounted in the main housing 476 of the hand gearing mechanism 410 by means of the bearings 478 and 480 so that the member 474 may be rotated about the wrist bend axis 98. Accordingly, when the output shaft 368 of the main gearing 314 is rotated, the wrist bend output member 474 is rotated so that the outer end portion 482 thereof is pivotally moved around the forward edge of the housing 476 along the bend axis 98.

Considering now the manner in which rotation of the output shaft 372 is employed to effect the wrist swivel movement, the splined shaft 442 has a drive pinion 490 on the end thereof which is in mesh with an idler gear 492 rotatably mounted on an idler shaft 494. The idler gear 492 is in engagement with a gear 496 mounted on one end of a shaft 498 which is rotatably mounted in a sleeve 500 by means of the bearings 502 and carries a beveled gear 504 on the other end thereof. The beveled gear 504 is in mesh with a beveled gear 506 formed on one end of a transverse sleeve 508 which is rotatably mounted on a transverse shaft 510, the shaft 510 being in turn rotatably supported at one end thereof within the housing 476 by means of the bearing 512 and is connected at the other end thereof to a bore 514 formed in the bend output member 474 so that the shaft 510 is aligned with the bend axis 98 and the member 474 may be rotated about this axis while at the same time permitting the sleeve 504 to be independently driven through the swivel gearing described heretofore.

A beveled gear 516 is formed in the other end of the sleeve 508 and engages a beveled input gear 518 of a planetary gear drive unit 520 which is rotatably mounted in the member 474 by means of the bearing 522 and includes an offset shaft 524 on which are mounted a first gear 526 in engagement with an internal toothed ring gear 528 which is connected to the bend output member 474, and a gear 530 which is in engagement with an internal toothed ring gear 532 secured in one end of a wrist swivel output member 534. The member 534 is rotatably mounted in the outer end portion 482 of the bend member 474 by means of the bearings 536 and 538. The wrist swivel output member 534 is provided with a socket 540 adapted to receive any one of a number of interchangeable article gripping members, or other tools, and is provided with passageways 542 and 544 by means of which compressed air can be supplied to the groove 546 and may be employed to actuate the article gripping hand which is placed in the socket 540, as will be readily understood by those skilled in the art. The passageway 542 communicates with a groove 548 formed in the periphery of the wrist bend output member 534, the groove 548 in turn communicating with an opening 550 in the outer portion 482 of the bend output member 474 so that compressed air may be supplied by way of the conduit 552 (FIG. 13), through the rotating joint 554 which is positioned on the wrist bend axis 98 and is attached to one side of the hand gearing 410, and through the output conduit 556 to the opening 550. Accordingly, compressed air is supplied to the groove 546 for actuation of the article gripping fingers while permitting movement in the above described wrist bend and wrist swivel axes.

Figure 20:
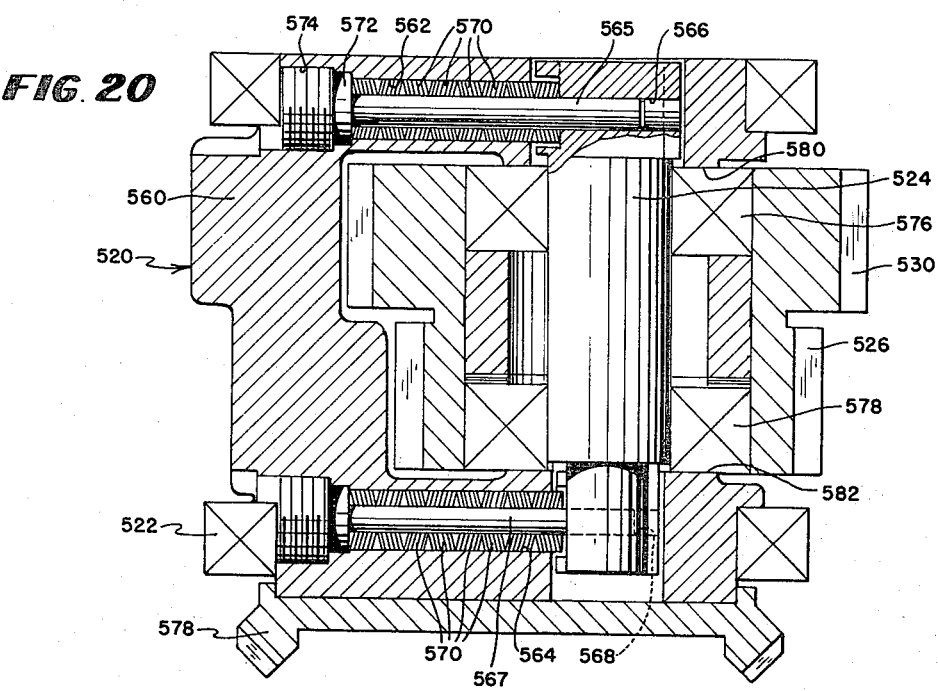
FIG. 20 is a sectional view of one of the differential drive units of FIG. 19 taken on a larger scale.

As stated generally heretofore, it is an important aspect of the invention to provide a programmable manipulator arm arrangement which is highly versatile and may be moved at high speed and positioned accurately so as to accomplish assembly of parts to close tolerances in a minimum amount of time. The above described ball-screw drives for the three major axes accomplish these objectives since they are powerful enough to rotate and tilt the relatively massive shoulder arm portion 84 and pivot the elbow arm portion 90. Furthermore, these ball screw linear actuators provide a substantial step down ratio so that a relatively stiff drive means is provided for positioning these relatively massive portions of the manipulator arm to the desired accuracy. However, with regard to motion in the three outer axes, these motions are obtained by direct gearing as described in detail heretofore and it is highly essential that all backlash be removed from the gear trains associated with each of these axes. Furthermore, it is important that an arrangement be provided in which backlash will not be introduced upon wear of the parts so that continuous usage of the manipulator without substantial downtime is provided. Elimination of backlash is particularly important in the complex hand gearing mechanism 410 since the article gripping fingers must be precisely positioned in order to accomplish assembly of small parts. To this end, each of the planetary drive units 460 and 520 is provided with a backlash eliminating arrangement which is maintained despite wear of the intermeshing parts. More particularly, with respect to the planetary unit 520 shown in FIG. 20, the main housing 506 thereof is provided with a pair of transverse bores 562 and 564 which communicate with the ends of the shaft 524, these end portions of the shaft 524 being provided with bores 566 and 568 which receive transversely extending pins 565 and 567. The pins 565 and 567 are adapted to receive a plurality of stacks of Belleville spring washers 570, each stack consisting of 8 or 9 springs and alternate stacks of springs being opposite oriented, as shown in FIG. 20. The springs 570 may be held under pressure by means of a cap 572 which is held in place by a nut threaded into the threaded bore 574, so that side thrust is exerted on both ends of the shaft 524. The shaft 524 is mounted in the bearings 576 and 578 between end faces 580 and 582 of the housing 560 so that the entire assembly including the gears 526, 530 and the bearings 576 and 578 may be urged laterally under the force of the Belleville springs 570. Accordingly, when the planetary unit 520 is mounted in the hand mechanism 410, as shown in FIG. 19, the teeth of the gears 526 and 530 are urged respectively into engagement with the ring gears 528 and 532 so as to remove all backlash in the planetary gear system. Preferably, the Belleville washers 570 provide approximately 300 pounds of side thrust and are operated over a portion of the force/deflection characteristic of the springs in which the force remains relatively constant with variation in deflection of the spring. Accordingly, when the moving parts become worn and the deflection of the Belleville springs 570 changes slightly, the force exerted by these springs will still be relatively constant so as to provide an automatic adjustment for wear which continuously eliminates backlash. Furthermore, with the disclosed arrangement it is not necessary to disassemble the hand gearing mechanism 410 in order to compensate for changes in backlash due to wear, or the like.

In connection with the automatic assembly station apparatus described thus far, it should be pointed out that the speed and accuracy with which the manipulator arms 50 and 52 are moved in assembling parts on a mass production basis must be considerably greater than that presently available in industrial robots if the automatic assembly station is to be economically feasible. Preferably, the speed and accuracy with which parts are assembled should be one and one-half times that of a human being to justify the use of such assembly stations. Such requirements for speed and accuracy demands not only a stiffer supporting structure and drive mechanism but also a lightweight design which will give the manipulator arm a high enough natural frequency so that it can respond to the desired control signals in a minimum amount of time. With the arrangement of the present invention, the hydraulically driven ball screws and high reduction ratio gear boxes provide the necessary stiffness in structure which is considerably superior to the hydraulic cylinder actuator type of drive employed previously for moving the controlled axes of a manipulator apparatus. While the hydraulic cylinder actuator is superior in response to a pneumatic one, the oil column in the cylinder is compressible and reflects the condition of all load changes and variations and hence is too soft and spongy to be used for rapid assembly of parts.

The hydraulically driven ball screw drive arrangements described in detail heretofore provide a stiffness which is several orders of magnitude better than the hydraulic vane motor type of drive arrangement. In this connection it is also pointed out that the amount of stiffness required is related to the inertia of the mass that is to be driven. For the wrist bend and wrist swivel motions, less stiffness is required than for the major arm articulations. Thus, if stiffness is plotted against moment of inertia, a diagonal line across the plot will represent a constant natural frequency and the wrist articulations and major arm articulations will lie on a constant frequency line, the larger inertia major articulations requiring a larger angular stiffness along this line. The arrangement of the present invention provides an increase in natural frequency of approximately one order of magnitude which results in a speed increase of a factor of two for short motions and a five-fold increase in accuracy. The arrangement of the present invention also provides hand gear trains which are relatively small so that the manipulator hands may be programmed to assemble small parts and at the same time provides the above described planetary gear systems which provide approximately sixteen to one reduction, which when combined with the two to one input gear reduction provides an overall thirty-two to one ratio which provides the desired output speed in relative to conventional motor speeds. It is also pointed out that the inertia forces of the high speed elements in the manipulator arm are minimized in accordance with the present invention by selecting a ball screw with a relatively coarse pitch. Thus, the ball screw such as the ball screw 160 provided in the actuating unit 142, preferably has a pitch of one thread per inch so that when driven at a maximum speed of 1500 inches per minute the inertial forces of the drive elements do not become excessive.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator, the combination of, a base member mounted for rotation about a vertical axis, a first arm portion pivotally mounted on said base member for rotation about a first horizontal axis, a second arm portion mounted on the upper end of said first arm portion for movement about a second horizontal axis, a manipulator hand mounted on the outer end of said second arm portion and movable about a wrist bend axis which is perpendicular to the longitudinal axis of said second arm portion, said hand having a swivel portion on the outer end thereof which is rotatable about a wrist swivel axis which is perpendicular to said wrist bend axis, means for rotating said first and second arm portions about their respective axes, and drive means for said hand and swivel portions mounted on said first arm portion and movable therewith.

2. The combination of claim 1, wherein said drive means for said first arm portion includes a housing pivotally mounted in said base member, an hydraulic motor mounted in said housing, a ball-screw linear actuator mounted in said housing and including a nut movable along the length of said screw as the same is rotated, gear means interconnecting said motor and said screw, a flange projecting outwardly from the upper end of said first arm portion, and means interconnecting said nut and said flange so that extension and retraction of said actuator is effective to pivot said first arm portion about said first horizontal axis.

3. The combination of claim 1, wherein said drive means for said second arm portion includes a housing pivotally mounted in said first arm portion, an hydraulic motor mounted in said housing, a ball-screw linear actuator mounted in said housing and including a nut movable along the length of said screw as the same is rotated, gear means interconnecting said motor and said screw, a flange extending rearwardly from said second arm portion, and means interconnecting said nut and said flange so that extension and retraction of said actuator is effective to pivot said second arm portion about said second horizontal axis.

4. The combination of claim 1, which includes a work head connected to said swivel hand portion and including a pneumatic work chamber, and means for supplying air to said chamber through said swivel hand portion.

5. The combination of claim 1, which includes a support, means rotatably mounting said base member on said support, a housing pivotally connected to said support, an hydraulic motor mounted in said housing, a ball-screw linear actuator mounted in said housing and including a nut movable along the length of said screw as the same is rotated, gear means interconnecting said motor and said screw, and means interconnecting said nut and a point on said base member which is offset from the central rotary axis thereof so that extension and retraction of said actuator is effective to move said base member through a predetermined limited arc about said central axis.

6. The combination of claim 5, wherein said limited arc is approximately 110°.

7. The combination of claim 1, wherein said drive means includes a first motor for said hand and a second motor for said swivel portion, said first and second motors being positioned relatively close to the central axis of said first arm portion and having the drive shafts thereof extending generally parallel to said central axis, thereby to limit the rotational inertia of said first arm portion.

8. The combination of claim 7, which includes a pair of beveled ring gears independently mounted for rotation about said second horizontal axis, means interconnecting said first and second motors with said pair of beveled ring gears to rotate the same, means including first gear means interconnecting one of said beveled ring gears and said hand, thereby to move said hand about said wrist bend axis, and means including second gear means interconnecting the other of said beveled ring gears with said swivel portion to move the same about said wrist swivel axis.

9. The combination of claim 8, which includes wrist bend encoder means and wrist swivel encoder means each having an input shaft, means including a first beveled gear in engagement with one of said pair of beveled ring gears for driving one of said input shafts, and means including a second beveled gear in engagement with the other of said pair of beveled ring gears for driving the other one of said input shafts.

10. The combination of claim 1, which includes a housing mounted on the end of said second arm portion, an input shaft rotatably mounted in said housing, a motor mounted on said first arm portion, means connecting the output shaft of said motor to said input shaft, a ring gear mounted on said hand, a shaft rotatably mounted in said housing, a gear in said shaft and in engagement with said ring gear, gear means interconnecting said shaft and said input shaft, and antibacklash means for continuously exerting a biasing force on said shaft in the direction to hold said gear in engagement with said ring gear.

11. The combination of claim 10 wherein said biasing force is exerted by a plurality of Belleville washers which are under compression.

12. The combination of claim 11, wherein said Belleville washers are compressed to a point at which the force exerted thereby remains relatively constant as the deflection of said washers varies due to wear and the like.

13. The combination of claim 1, wherein said second arm portion includes an elbow arm portion mounted for rotation about said second horizontal axis, and a forearm portion positioned concentric with said elbow arm portion and rotatable with respect thereto, said manipulator hand being mounted on the outer end of said forearm portion.

14. The combination of claim 13, which includes a work head connected to said swivel hand portion and including a pneumatic work chamber, means for supplying air to said elbow arm portion, air conduit means in said rotatable forearm portion and connected to said air supply, and means connecting said air conduit means to said air chamber through said swivel hand portion.

15. The combination of claim 13, which includes drive means for said forearm portion and includes a third motor positioned relatively close to the central axis of said first arm portion with the driveshaft thereof extending generally parallel to said central axis.

16. The combination of claim 15, wherein said forearm portion includes a sleeve portion rotatably mounted in said elbow arm portion, a ring gear mounted within said sleeve portion, and means interconnecting said third motor and said ring gear.

17. The combination of claim 16, which includes a beveled ring gear mounted for rotation about said second horizontal axis, means connected to the driveshaft of said third motor for rotating said beveled ring gear, and gear means interconnecting said beveled ring gear and said sleeve mounted ring gear.

18. The combination of claim 17, which includes forearm encoder means having an input shaft, and means including a beveled gear in engagement with said beveled ring gear for driving said input shaft.

* * * * *